United States Patent
Ishigaki et al.

(10) Patent No.: US 9,431,824 B2
(45) Date of Patent: Aug. 30, 2016

(54) DC-DC CONVERTER COMPRISING DC POWER SOURCES TO BE CONNECTED IN PARALLEL OR IN SERIES

(75) Inventors: Masanori Ishigaki, Nagoya (JP); Shuji Tomura, Nagoya (JP); Takaji Umeno, Nisshin (JP); Masaki Okamura, Toyota (JP); Daigo Nobe, Susono (JP); Yoshiyuki Nakamura, Miyoshi (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

(*) Notice: Subject to any disclaimer, the term of this patent is extended or adjusted under 35 U.S.C. 154(b) by 577 days.

(21) Appl. No.: 13/814,342

(22) PCT Filed: Sep. 21, 2011

(86) PCT No.: PCT/JP2011/005302
§ 371 (c)(1),
(2), (4) Date: Feb. 5, 2013

(87) PCT Pub. No.: WO2012/039131
PCT Pub. Date: Mar. 29, 2012

(65) Prior Publication Data
US 2013/0134786 A1    May 30, 2013

(30) Foreign Application Priority Data
Sep. 22, 2010    (JP) .................. 2010-212219

(51) Int. Cl.
*H02J 1/00*    (2006.01)
*H02M 3/158*    (2006.01)

(52) U.S. Cl.
CPC ............... *H02J 1/00* (2013.01); *H02M 3/158* (2013.01); *Y10T 307/653* (2015.04)

(58) Field of Classification Search
CPC ...... H02J 1/00; H02M 3/158; Y10T 307/653
See application file for complete search history.

(56) References Cited

U.S. PATENT DOCUMENTS 4,025,860 A * 5/1977 Shibata et al. ............... 320/126
5,345,375 A * 9/1994 Mohan ............................ 363/40
(Continued)

FOREIGN PATENT DOCUMENTS

DE    10 2011 056 667 A1    6/2012
EP    1 768 137 A1    3/2007
(Continued)

OTHER PUBLICATIONS

Sep. 2, 2014 Office action issued in Japanese Patent Application No. 2010-275507 (with translation).
(Continued)

*Primary Examiner* — Thienvu Tran
*Assistant Examiner* — Pinping Sun
(74) *Attorney, Agent, or Firm* — Oliff PLC

(57) ABSTRACT

The power supply system includes a first DC power source, a second DC power source, and a power converter having a plurality of switching elements and reactors. The power converter is configured to be switchable, by the control of the plurality of switching elements, between a parallel connection mode in which DC voltage conversion is executed with the DC power sources connected in parallel with a power line and a series connection mode in which DC voltage conversion is executed with the DC power sources connected in series with the power line. Each of the switching elements is arranged to be included both in a power conversion path between the first DC power source and the power line PL and a power conversion path between the second DC power source and the power line.

16 Claims, 20 Drawing Sheets

(56) References Cited

U.S. PATENT DOCUMENTS

| | | | |
|---|---|---|---|
| 6,333,570 B1 * | 12/2001 | Ilg | .................................... 307/75 |
| 6,574,125 B2 | 6/2003 | Matsukawa et al. | |
| 7,408,794 B2 | 8/2008 | Su | |
| 7,830,686 B2 | 11/2010 | Zeng et al. | |
| 8,130,524 B2 * | 3/2012 | Lee et al. | ...................... 363/132 |
| 8,829,713 B2 | 9/2014 | Ishigaki et al. | |
| 2006/0139823 A1 | 6/2006 | Shoji et al. | |
| 2009/0147541 A1 | 6/2009 | Shimada et al. | |
| 2009/0289751 A1 | 11/2009 | Nagano et al. | |
| 2010/0103585 A1 | 4/2010 | Mao et al. | |
| 2011/0180336 A1 | 7/2011 | Kurata | |
| 2011/0198933 A1 | 8/2011 | Ishigaki et al. | |

FOREIGN PATENT DOCUMENTS

| | | | |
|---|---|---|---|
| EP | 2 071 596 A2 | 6/2009 | |
| JP | A-2000-295715 | 10/2000 | |
| JP | A-2001-211645 | 8/2001 | |
| JP | A-2001-292567 | 10/2001 | |
| JP | A-2004-166443 | 6/2004 | |
| JP | A-2005-312249 | 11/2005 | |
| JP | A-2006-187147 | 7/2006 | |
| JP | A-2008-54477 | 3/2008 | |
| JP | 2008131830 A * | 6/2008 | .............. B60L 11/18 |
| JP | A-2008-131830 | 6/2008 | |
| JP | A-2009-059995 | 3/2009 | |
| JP | A-2009-146955 | 7/2009 | |
| JP | A-2009-219303 | 9/2009 | |
| JP | A-2009-284647 | 12/2009 | |
| JP | A-2010-57288 | 3/2010 | |
| JP | A-2010-87261 | 4/2010 | |
| JP | A-2012-134266 | 7/2012 | |
| JP | A-2013-013233 | 1/2013 | |
| WO | WO 2010063326 A1 * | 6/2010 | ............... H02J 9/06 |
| WO | WO 2011/092774 A1 | 8/2011 | |
| WO | WO 2012/039131 A2 | 3/2012 | |

OTHER PUBLICATIONS

Apr. 15, 2014 Japanese Office Action issued in Japanese Application No. 2012-061635 (with translation).

Feb. 13, 2014 Office Action issued in U.S. Appl. No. 13/027,726.

Jul. 1, 2013 International Search Report issued in International Application No. PCT/JP2013/001828.

U.S. Appl. No. 14/382,397, filed Sep. 2, 2014 in the name of Ishigaki et al.

International Search Report issued in International Patent Application No. PCT/JP2011/005302 dated Jun. 15, 2012.

International Preliminary Report on Patentability issued in International Patent Application No. PCT/JP2011/005302 dated Oct. 9, 2012.

Mar. 18, 2013 Written Opinion of the International Searching Authority issued in International Application No. PCT/JP2013/001828.

* cited by examiner

Fig. 3
(a)
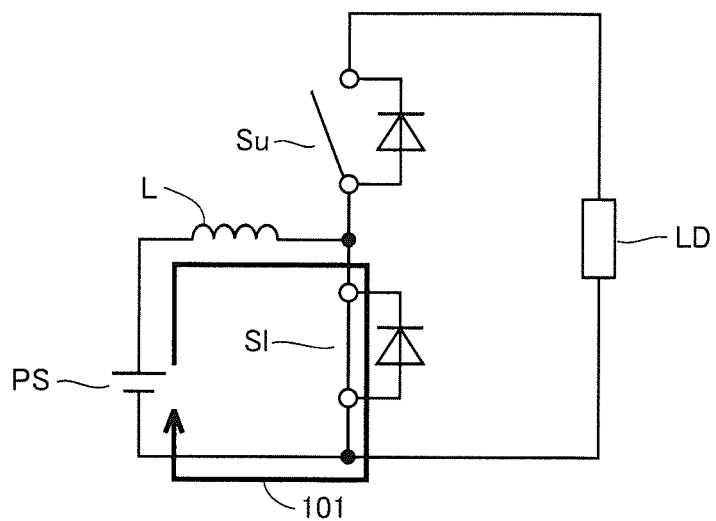
(b)
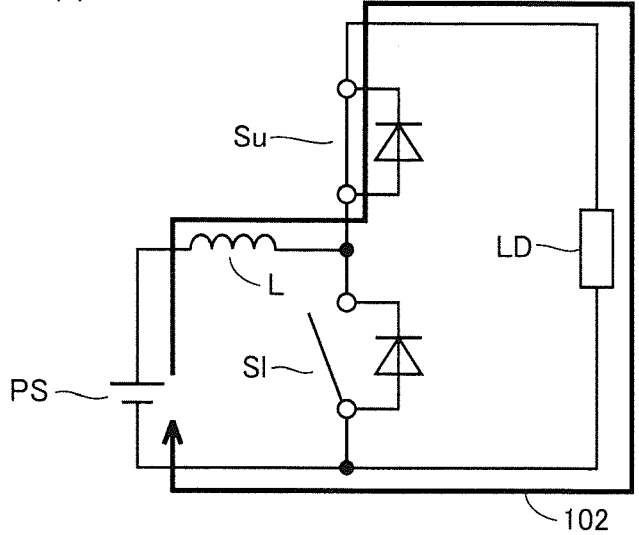

Fig. 4
(a)
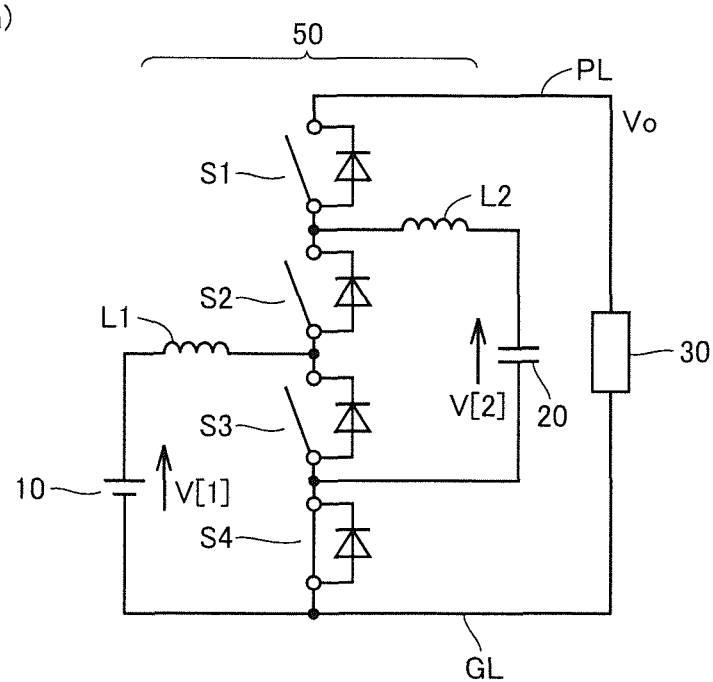
(b)
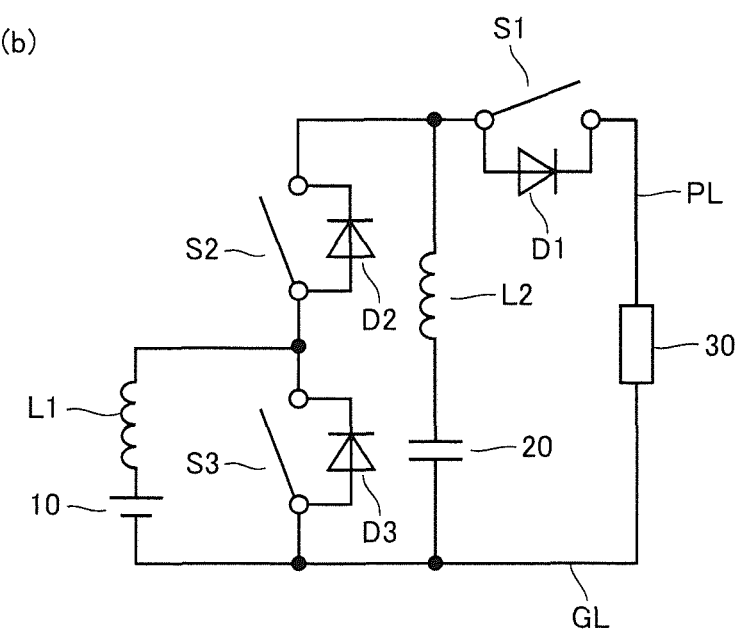

Fig. 5
(a)
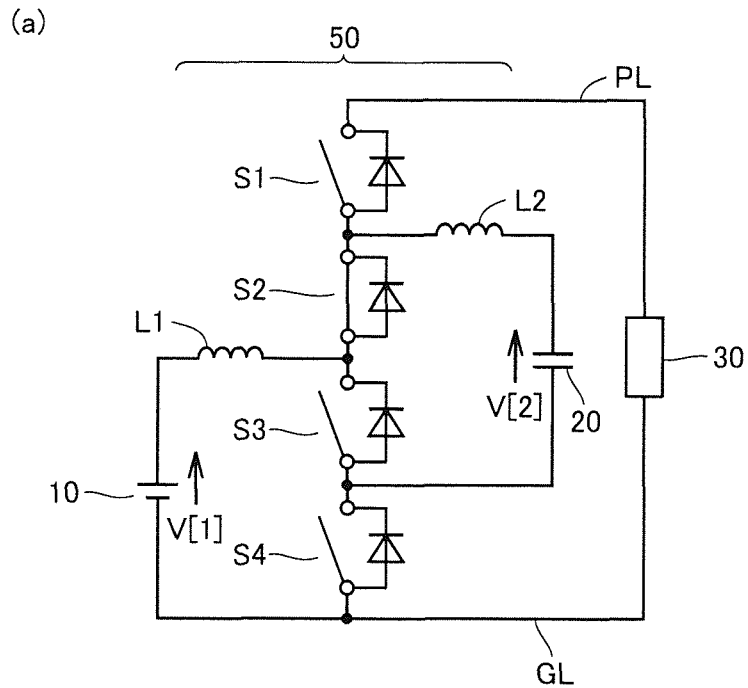
(b)
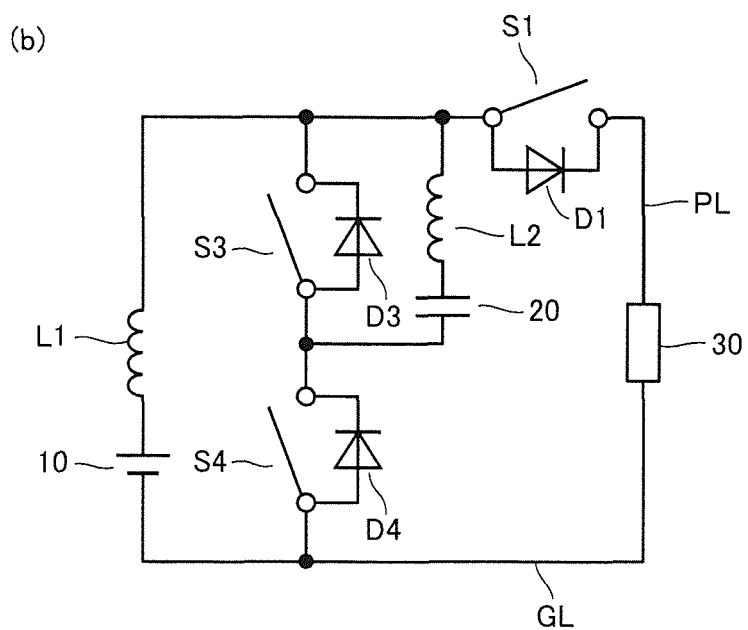

Fig. 6
(a)
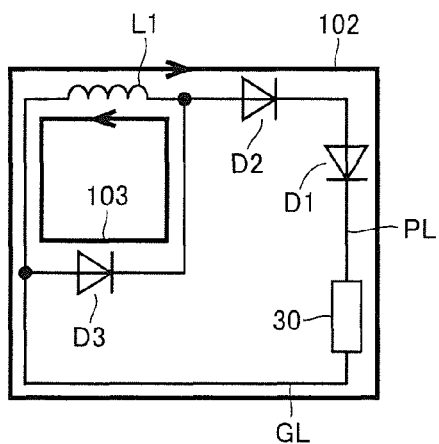
(b)
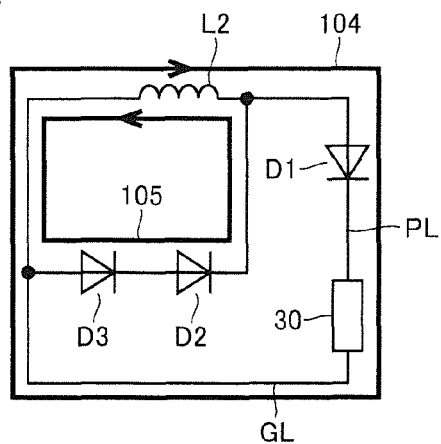
Fig. 7
(a)
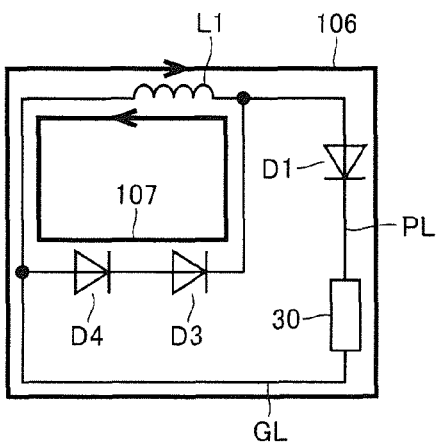
(b)
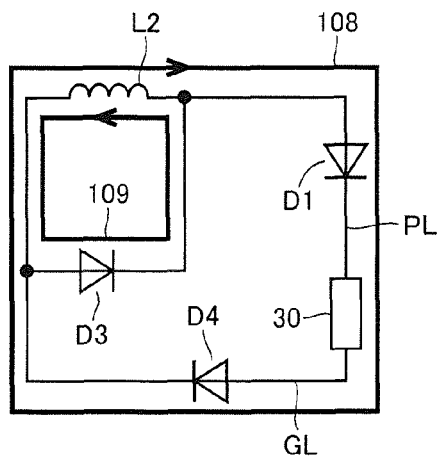

Fig. 8
(a)
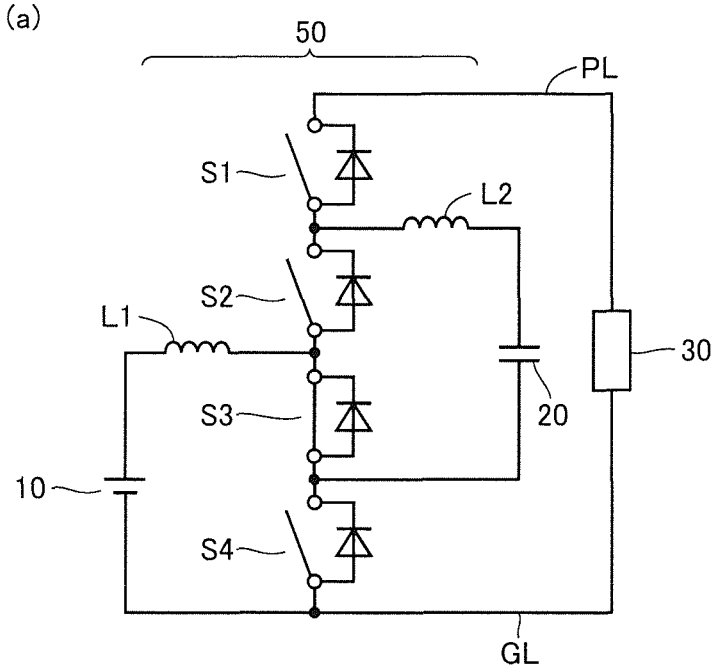
(b)
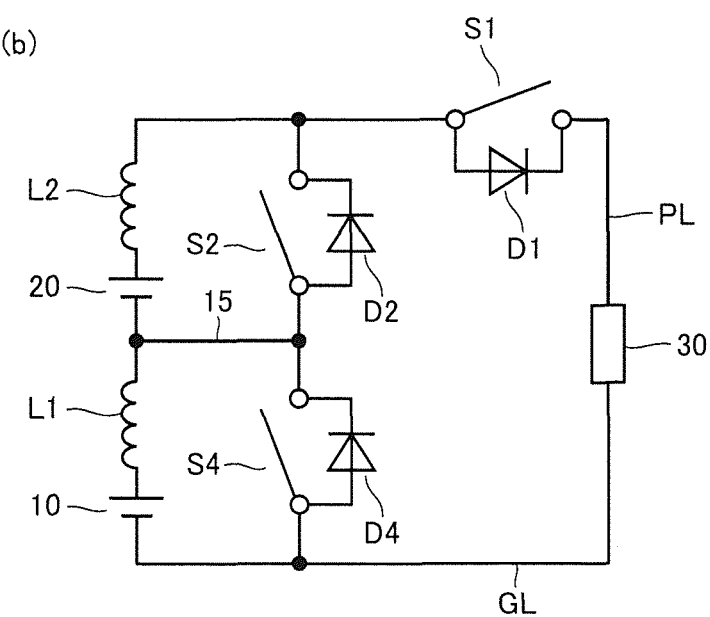

Fig. 9
(a)
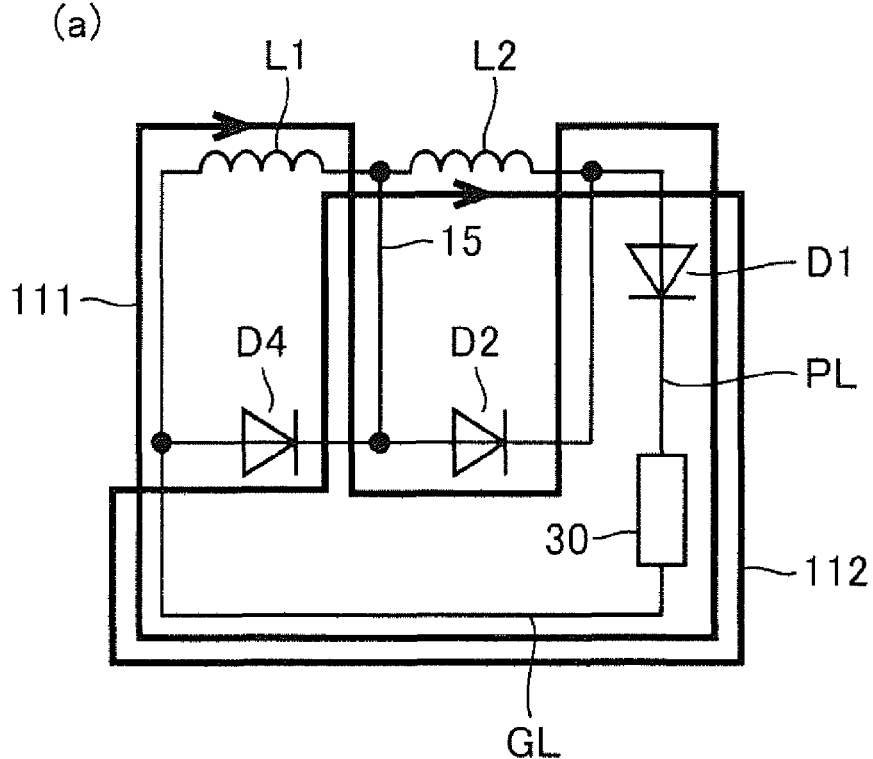
(b)
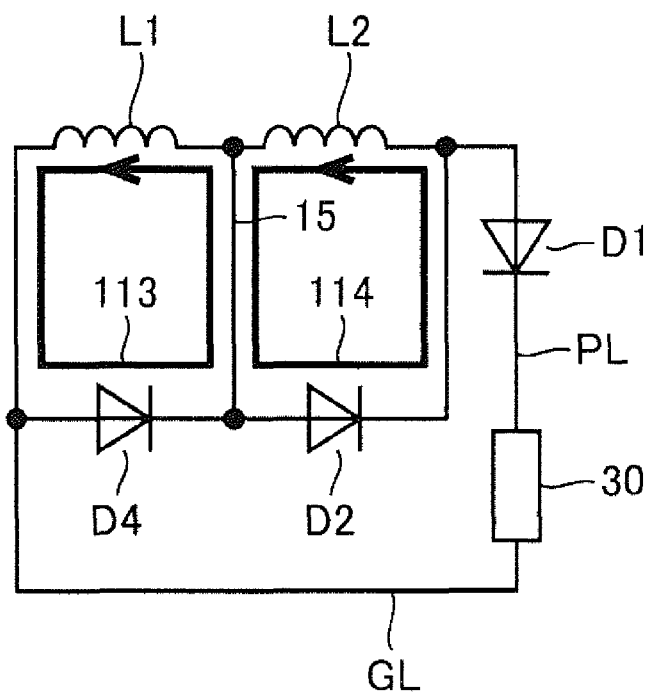

Fig. 11
(a)
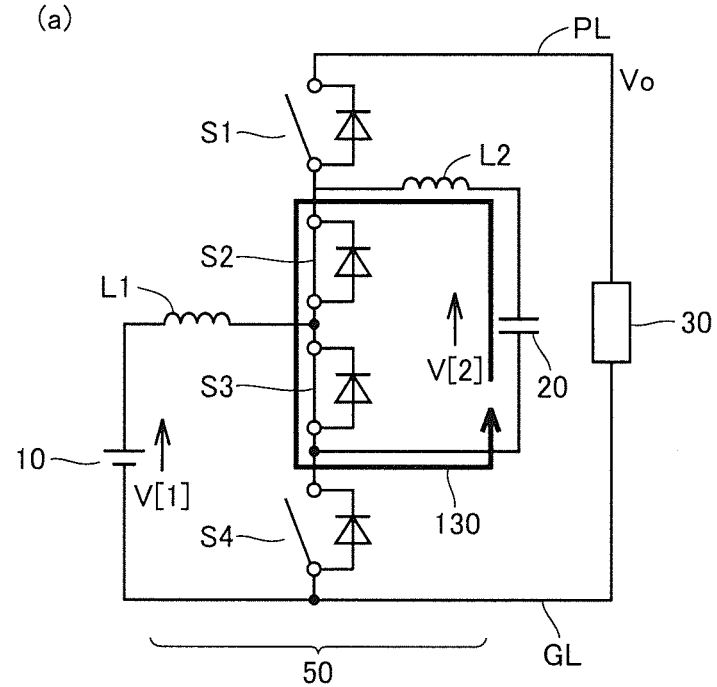
(b)
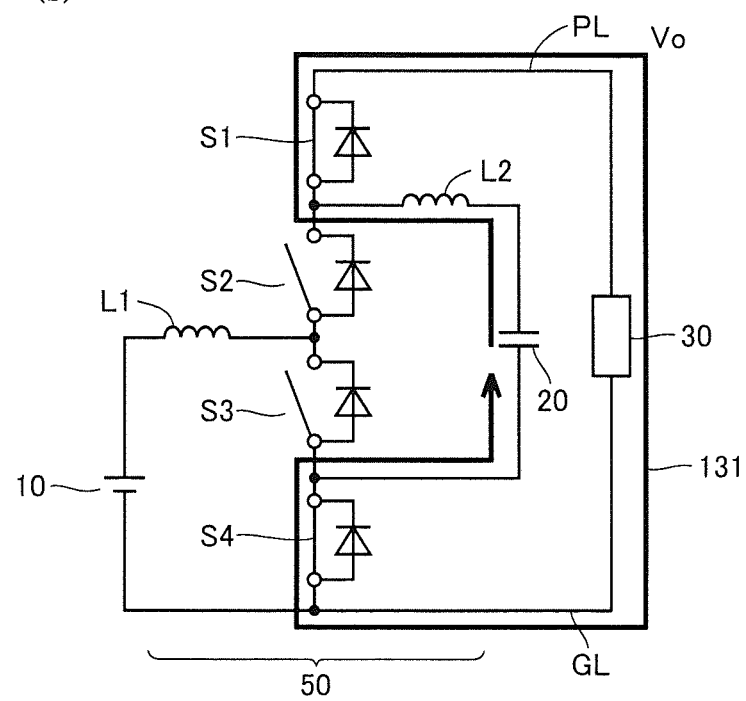

Fig. 12
(a)
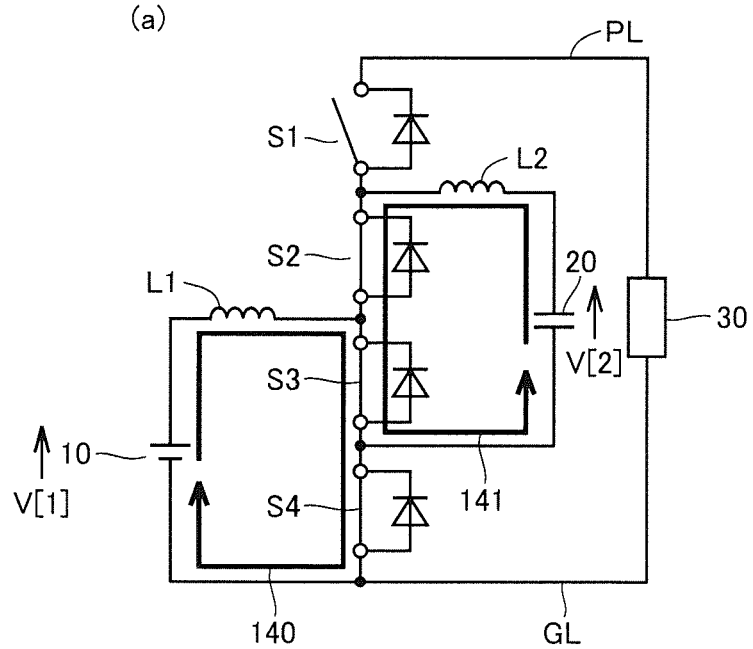
(b)
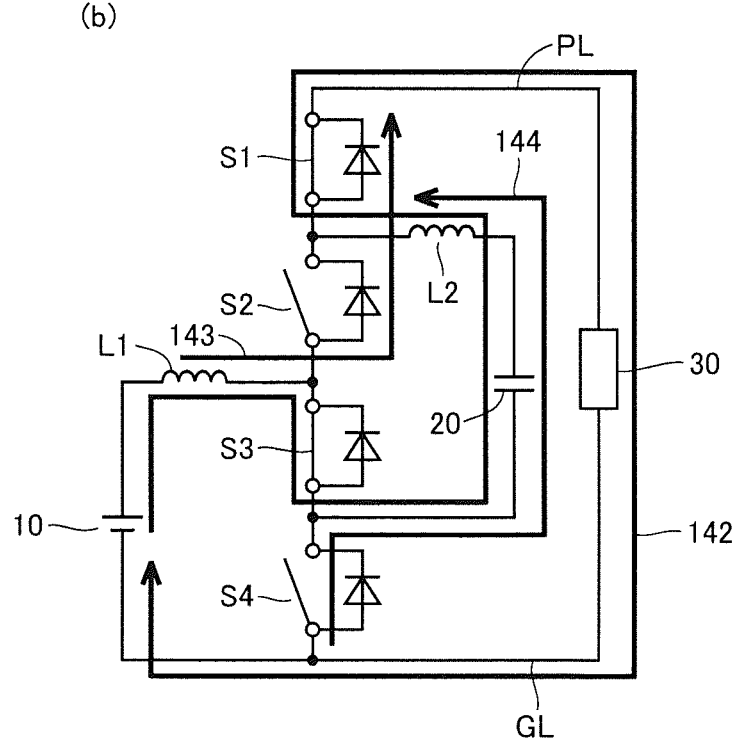

|  | PARALLEL CONNECTION I | PARALLEL CONNECTION II |
|---|---|---|
| SG1 | /SDa or /SDb | /SDa or /SDb |
| SG2 | /SDa or SDb | /SDa or SDb |
| SG3 | SDa or SDb | SDa or SDb |
| SG4 | SDa or /SDb | SDa or /SDb |
| Dv | Db | Da |
| Di | Da | Db |
| Hv | TRANSFER FUNCTION OF FIG. 11 | TRANSFER FUNCTION OF FIG. 10 |
| Hi | TRANSFER FUNCTION OF FIG. 10 | TRANSFER FUNCTION OF FIG. 11 |
| DvFF | (Vo−V[2])/Vo | (Vo−V[1])/Vo |
| DiFF | (Vo−V[1])/Vo | (Vo−V[2])/Vo |
| Ii | I[1] | I[2] |

Fig. 20
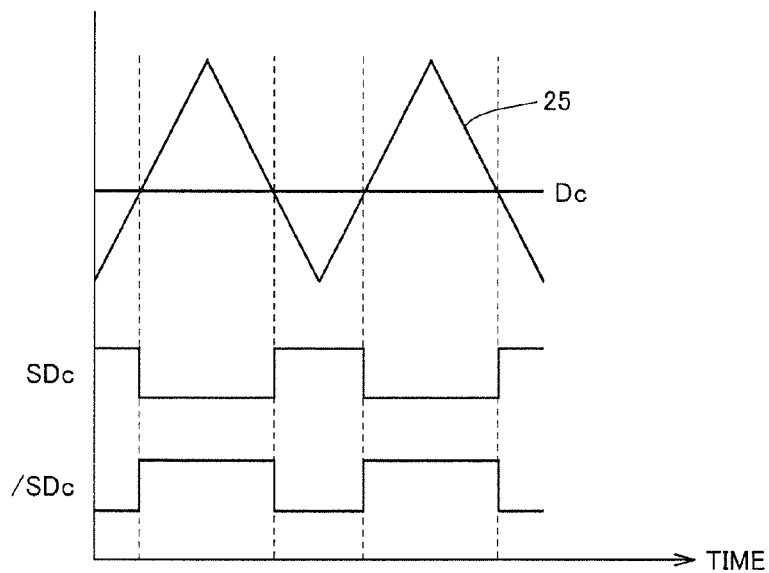
Fig. 21
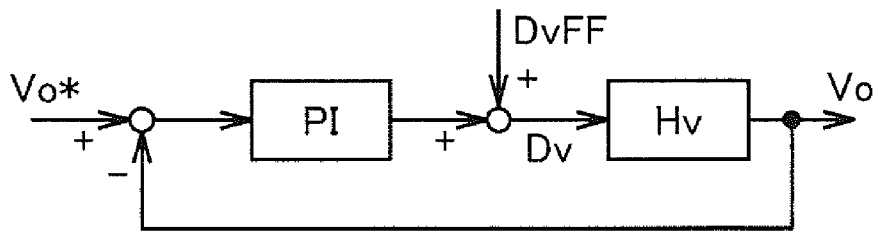
Fig. 22
| | SERIES CONNECTION |
|---|---|
| SG1 | /SDc |
| SG2 | SDc |
| SG3 | FIXED AT H |
| SG4 | SDc |
| Dv | Dc |
| Hv | TRANSFER FUNCTION OF FIG. 12 |
| DvFF | $\dfrac{\{Vo-(V[2]+V[1])\}}{Vo}$ |

| | STEP UP/DOWN |
|---|---|
| Sa | D |
| Sb | 1-D |
| Sc | 1-D |
| Sd | D |
| $\dfrac{VH}{Vi}$ | $\dfrac{D}{1-D}$ |

| | STEP UP | STEP DOWN |
|---|---|---|
| Sa | 1 | D |
| Sb | 0 | 1-D |
| Sc | 1-D | 1 |
| Sd | D | 0 |
| $\dfrac{VH}{Vi}$ | $\dfrac{1}{1-D}$ | D |

| ON THE SIDE OF DC POWER SOURCE 10 | STEP UP/DOWN |
|---|---|
| ON THE SIDE OF DC POWER SOURCE 20 | STEP UP/DOWN |
| SG5 | SDa |
| SG6 | /SDa |
| SG7 | SDb |
| SG8 | /SDb |
| SG1 | /SDa or /SDb |
| SG2 | /SDa or SDb |
| SG3 | SDa or SDb |
| SG4 | SDa or /SDb |

| ON THE SIDE OF DC POWER SOURCE 10 | STEP UP/DOWN |
|---|---|
| ON THE SIDE OF DC POWER SOURCE 20 | |
| SG5 | SDc |
| SG6 | /SDc |
| SG7 | SDc |
| SG8 | /SDc |
| SG1 | /SDc |
| SG2 | SDc |
| SG3 | FIXED AT H |
| SG4 | SDc |

Fig. 33

| | | STEP UP | | STEP DOWN | |
|---|---|---|---|---|---|
| | | STEP UP | STEP DOWN | STEP UP | STEP DOWN |
| ON THE SIDE OF DC POWER SOURCE 10 | SG5 | FIXED AT H | FIXED AT H | SDa | SDa |
| | SG6 | FIXED AT L | FIXED AT L | /SDa | /SDa |
| | SG7 | FIXED AT H | SDb | FIXED AT H | SDb |
| | SG8 | FIXED AT L | /SDb | FIXED AT L | /SDb |
| ON THE SIDE OF DC POWER SOURCE 20 | SG1 | /SDa or /SDb | FIXED AT H (/SDa or "H") | FIXED AT H ("H" or /SDb) | FIXED AT H ("H" or "H") |
| | SG2 | /SDa or SDb | /SDa(/SDa or "L") | FIXED AT H ("H" or SDb) | FIXED AT H ("H" or "L") |
| | SG3 | SDa or SDb | SDa(SDa or "L") | SDb("L" or SDb) | FIXED AT L ("L" or "L") |
| | SG4 | SDa or /SDb | FIXED AT H (SDa or "H") | /SDb("L" or /SDb) | FIXED AT L ("L" or "H") |

Fig. 34

| ON THE SIDE OF DC POWER SOURCE 10 / ON THE SIDE OF DC POWER SOURCE 20 | STEP UP | STEP DOWN |
|---|---|---|
| SG5 | FIXED AT H | SDc |
| SG6 | FIXED AT L | /SDc |
| SG7 | FIXED AT H | SDc |
| SG8 | FIXED AT L | /SDc |
| SG1 | /SDc | FIXED AT H |
| SG2 | SDc | FIXED AT L |
| SG3 | FIXED AT H | FIXED AT H |
| SG4 | SDc | FIXED AT L |

DC-DC CONVERTER COMPRISING DC POWER SOURCES TO BE CONNECTED IN PARALLEL OR IN SERIES

TECHNICAL FIELD

The present invention relates to a power supply system and, more specifically, to a power supply system for exchanging electric power between two DC power sources and a load.

BACKGROUND ART

Japanese Patent Laying-Open No. 2000-295715 (hereinafter referred to as PTL 1) describes a power supply system for an electric vehicle in which electric power is supplied from two DC power sources to a load (vehicle driving electric motor). In PTL 1, two electric double layer capacitors are used as DC power sources. It is described that an operation mode is provided in which the two electric double layer capacitors are connected in parallel for supplying electric power to the load.

Japanese Patent Laying-Open No. 2008-54477 (hereinafter referred to as PTL 2) describes a voltage converting device having a plurality of DC voltages as inputs and outputting a plurality of DC voltages. In the voltage converting device described in PTL 2, operation modes are switched by switching connection between a terminal of energy storage means (coil) and a plurality of input potentials as well as a plurality of output potentials. The operation modes include a mode in which two DC power sources are connected in parallel for supplying electric power to the load.

Further, Japanese Patent Laying-Open No. 2010-57288 (hereinafter referred to as PTL 3) describes a configuration of an electric power supplying device including first and second power storage units, provided with a switch for switching series connection and parallel connection between the power storage units.

CITATION LIST

Patent Literature

PTL 1: Japanese Patent Laying-Open No. 2000-295715
PTL 2: Japanese Patent Laying-Open No. 2008-54477
PTL 3: Japanese Patent Laying-Open No. 2010-57288

SUMMARY OF INVENTION

Technical Problem

In the configurations of PTLs 1 and 2, it is possible to connect two DC power sources in parallel to supply electric power to the load. Series connection of the two DC power sources, however, is not considered.

In the configuration of PTL3, series connection and parallel connection of the first and second power storage units are switched, to change the voltage to be applied to an inverter that controls driving of a motor generator. Specifically, Patent Literature 3 does not consider a DC voltage converting function with respect to an output voltage from the series-connected or parallel-connected power storage units.

Therefore, in the power supply system controlling an output power to a load in accordance with a voltage command value, it may be impossible to effectively use the two DC power sources in the configurations described in PTLs 1 to 3.

The present invention was made to solve the above-described problem, and its object is to provide a configuration of a power supply system including two DC power sources allowing effective use of the two DC power sources while controlling the output voltage to the load.

Solution to Problem

According to an aspect, the present invention provides a power supply system, including: a first DC power source; a second DC power source; and a power converter configured to include a plurality of switching elements. The power converter executes DC voltage conversion between the first and second DC power sources and a power line electrically connected to a load, so as to control an output voltage on the power line. The power converter is configured to be switchable, by controlling the plurality of switching elements, between a first operation mode in which the DC voltage conversion is executed with the first and second DC power sources electrically connected in parallel with the power line and a second operation mode in which the DC voltage conversion is executed with the first and second DC power sources electrically connected in series with the power line.

Preferably, the plurality of switching elements include first to fourth switching elements, and the voltage converter includes first and second reactors. The first switching element is electrically connected between the power line and a first node. The second switching element is electrically connected between a second node and the first node. The third switching element is electrically connected between a third node electrically connected to a positive terminal of the second DC power source and the second node. The fourth switching element is electrically connected between a negative terminal of the second DC power source and the third node. The first reactor is electrically connected between the second node and a positive terminal of the first DC power source. The second reactor is electrically connected between the first node and the positive terminal of the second DC power source.

More preferably, in the first operation mode, the power converter controls on/off of the first to fourth switching elements such that the first and third switching elements turn on/off complementarily and the second and fourth switching elements turn on/off complementarily, in accordance with a logical sum of a first control signal for the DC voltage conversion between the first DC power source and the power line and a second control signal for the DC voltage conversion between the second DC power source and the power line.

Preferably, in the first operation mode, the power converter controls the DC voltage conversion between one of the first and second DC power sources and the power line such that the output voltage becomes equal to a command voltage and controls the DC voltage conversion between the other one of the first and second DC power sources and the power line such that a current of the other one of the DC power sources becomes equal to a command current.

More preferably, in the second operation mode, the power converter controls on/off of the first to fourth switching elements such that the third switching element is fixed on, while the second and fourth switching elements and the first switching element are turned on/off complementarily in accordance with a control signal for the DC voltage conversion between the series-connected first and second DC power sources and the power line.

Preferably, in the second operation mode, the power converter controls the DC voltage conversion between the series-connected first and second DC power sources and the power line such that the output voltage becomes equal to a command voltage.

Preferably, each of the plurality of switching elements is controlled in accordance with a logical sum of a control signal for connecting the first and second DC power sources in parallel or in series with the power line and a control signal for the DC voltage conversion in the first or second operation mode.

Preferably, the plurality of switching elements include a switching element which is fixed on to connect the first and second DC power sources in series in the second operation mode and turned on/off in accordance with a duty ratio for DC voltage conversion for controlling the output voltage in the first operation mode.

Preferably, at least a part of the plurality of switching elements are arranged to be included both in a first power conversion path formed between the first DC power source and the power line in the first operation mode and in a second power conversion path formed between the second DC power source and the power line in the first operation mode.

More preferably, at least a part of the switching elements are turned on/off in accordance with a logical sum of a first control signal for the DC voltage conversion between the first DC power source and the power line and a second control signal for the DC voltage conversion between the second DC power source and the power line, in the first operation mode. At least a part of the switching elements are classified to a switching element which is fixed on to connect the first and second DC power sources in series and switching elements which are turned on/off in accordance with a duty ratio for DC voltage conversion for controlling the output voltage in the second operation mode.

Preferably, the first and second DC power sources have rated output voltages different from each other. Alternatively, the first and second DC power sources have output energy densities different from each other and output power densities different from each other.

Advantageous Effects of Invention

According to the present invention, by the control of a plurality of switching elements, it is possible to switch between the operation mode in which DC voltage conversion is executed between two series-connected DC power sources and the load (series connection mode) and the operation mode in which DC voltage conversion is executed between two parallel-connected DC power sources and the load (parallel connection mode). By the switching between the series connection mode and the parallel connection mode, it becomes possible to effectively use the two DC power sources in consideration of the efficiency of power supply system and the security of output power, while controlling the output voltage to the load.

BRIEF DESCRIPTION OF DRAWINGS

FIG. 3 includes circuit diagrams illustrating an operation of the step-up chopper circuit shown in FIG. 2.

FIG. 4 includes circuit diagrams illustrating a first circuit operation in the parallel connection mode.

FIG. 5 includes circuit diagrams illustrating a second circuit operation in the parallel connection mode.

FIG. 6 includes circuit diagrams illustrating recirculation paths for reactors at the time of circuit operation shown in FIG. 4.

FIG. 7 includes circuit diagrams illustrating recirculation paths for reactors at the time of circuit operation shown in FIG. 5.

FIG. 8 includes circuit diagrams illustrating a circuit operation in the series connection mode.

FIG. 9 includes circuit diagrams illustrating recirculation paths for reactors at the time of circuit operation shown in FIG. 8.

FIG. 11 includes circuit diagrams illustrating DC voltage conversion (step-up operation) for the second DC power source in the parallel connection mode.

FIG. 12 includes circuit diagrams illustrating DC voltage conversion (step-up operation) in the series connection mode.

FIG. 20 is a diagram of waveforms representing an exemplary control operation in the series connection mode.

FIG. 21 shows an exemplary configuration of a power source control block in the series connection mode.

FIG. 22 is a table showing settings of various control data in the series connection mode.

FIG. 33 is a table representing on/off control of the switching elements in the parallel connection mode in the indirect voltage up/down mode of the power supply system in accordance with a modification of an embodiment of the present invention.

FIG. 34 is a table representing on/off control of the switching elements in the series connection mode in the indirect voltage up/down mode of the power supply system in accordance with a modification of an embodiment of the present invention.

DESCRIPTION OF EMBODIMENTS

Figure 1:
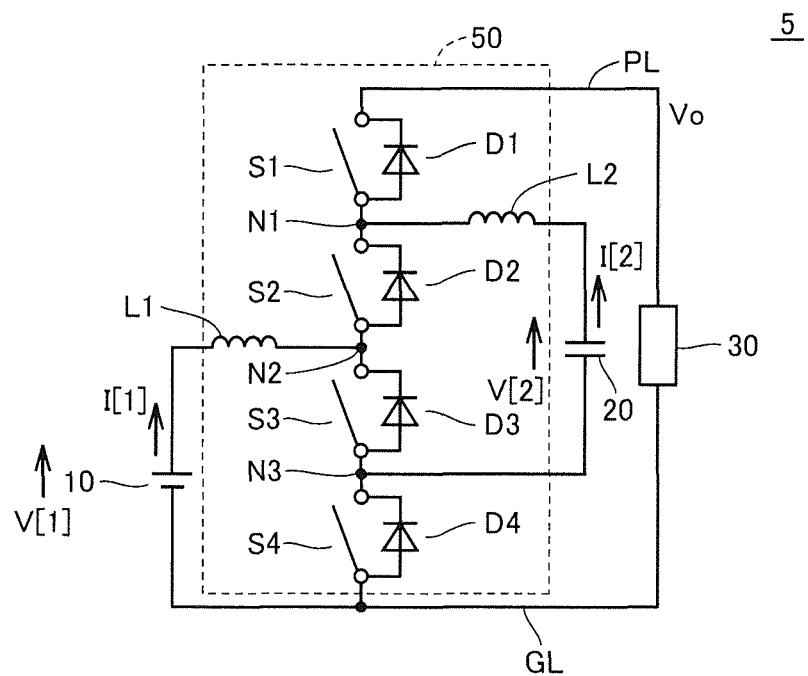
FIG. 1 is a circuit diagram showing an exemplary configuration of the power supply system in accordance with an embodiment of the present invention.

In the following, embodiments of the present invention will be described in detail with reference to the figures. In the figures, the same or corresponding portions are denoted by the same reference characters and, basically, description thereof will not be repeated.

(Circuit Configuration)

FIG. 1 is a circuit diagram showing an exemplary configuration of the power supply system in accordance with an embodiment of the present invention.

Referring to FIG. 1, a power supply system 5 includes DC power sources 10 and 20, a load 30, and a power converter 50. In the present embodiment, DC power source 10 is formed, for example, by a secondary battery such as a lithium ion secondary battery or a nickel hydride battery. On the other hand, DC power source 20 is formed of a DC voltage source element having superior output characteristic such as an electric double-layer capacitor or a lithium ion capacitor. DC power sources 10 and 20 correspond to the "first DC power source" and the "second DC power source," respectively.

Power converter 50 is connected between DC power sources 10 and 20 and load 30. Power converter 50 is configured to control a DC voltage (hereinafter also referred to as output voltage Vo) on a power line PL connected to load 30 in accordance with a voltage command value.

Load 30 operates receiving the output voltage Vo of power converter 50. The voltage command value of output voltage Vo is set to a value appropriate for the operation of load 30. The voltage command value may be variably set in accordance with the state of load 30. Load 30 may be configured to be able to generate charging power for charging DC power sources 10 and 20.

Power converter 50 includes power semiconductor switching elements S1 to S4, and reactors L1 and L2. In the present embodiment, as the power semiconductor switching element (herein after also simply referred to as "switching element"), an IGBT (Insulated Gate Bipolar Transistor), power MOS (Metal Oxide Semiconductor) transistor or a power bipolar transistor may be used. For switching elements S1 to S4, anti-parallel diodes D1 to D4 are arranged.

Further, switching elements S1 to S4 can be on/off controlled in response to a control signal, not shown.

Switching element S1 is electrically connected between a power line PL and a node N1. Reactor L2 is connected between node N1 and a positive terminal of DC power source 20. Switching element S2 is electrically connected between nodes N1 and N2. Reactor L1 is connected between node N2 and a positive terminal of DC power source 10. Switching element S3 is electrically connected between nodes N2 and N3. Switching element S4 is electrically connected between node N3 and a ground line GL. Ground line GL is electrically connected to load 30 and a negative terminal of DC power source 10.

Power converter 50 shown in FIG. 1 is configured to include a step-up chopper circuit for each of DC power sources 10 and 20.

Figure 2:
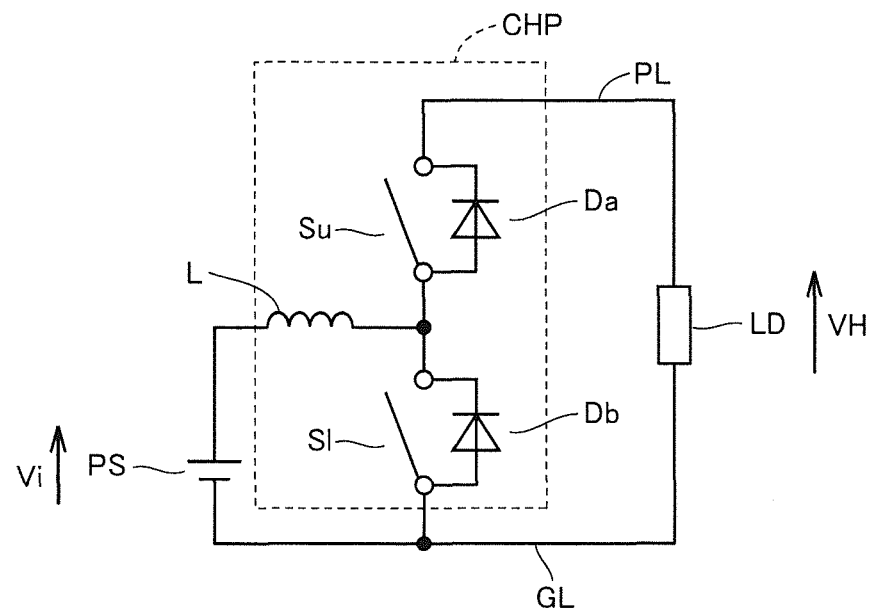
FIG. 2 shows a configuration of a common step-up chopper circuit.

FIG. 2 shows a configuration of a common step-up chopper circuit.

Referring to FIG. 2, a step-up chopper circuit CHP has an upper arm switching element Su (hereinafter also referred to as an upper arm element), a lower arm switching element S1 (hereinafter also referred to as a lower arm element), and a reactor L.

Reactor L is electrically connected to a node between upper arm element Su and lower arm element S1 and a positive terminal of a DC power source PS. Upper arm element Su and lower arm element S1 are connected in series between power line PL and ground line GL. In step-up chopper circuit CHP, an on-period of upper arm element Su (lower arm element S1 is off) and an on-period of lower arm element S1 (upper arm element Su is off) are provided alternately.

As shown at (a) of FIG. 3, in the on-period of lower arm element S1, a current path 101 passing through DC power source PS-reactor L-switching element S1 is formed. Thus, energy is stored in reactor L.

On the other hand, as shown at (b) of FIG. 3, in the on-period of upper arm element Su in which lower arm element S1 is off, a current path 102 through DC power source PS-reactor L-upper arm element Su-load LD is formed. Thus, the energy stored in reactor L during the on-period of lower arm element S1 and the energy from DC power source PS are supplied to load LD. Thus, the output voltage to load LD is made higher than the output voltage of DC power source PS.

Further, as the upper arm element Su is turned on in the off-period of lower arm element S1, electric power can be exchanged bi-directionally with load LD. Particularly, it becomes possible to receive regenerative current from load LD while controlling output voltage Vo, without necessitating switching of control with respect to the current direction between power converter 50 and load LD.

The voltage conversion ratio (step-up ratio) of step-up chopper circuit CHP is known to be expressed by Equation (1) below, using voltage Vi of DC power source PS, output voltage VH to load LD and duty ratio DT of the lower arm element. Here, the duty ratio DT is defined by the ratio of on-period of lower arm element to the switching period in which the upper and lower arm elements are turned on/off alternately.

$$VH = 1/(1-DT) \times Vi \quad (1)$$

Power converter 50 is characterized in that it is switched between the parallel connection mode in which parallel-connected DC power sources 10 and 20 exchange electric power to/from load 30 and the series connection mode in which series-connected DC power sources 10 and 20 exchange electric power to/from load 30, by the control of switching elements S1 to S4.

In the parallel connection mode, DC voltage conversion for controlling output voltage Vo of power line PL is executed with DC power sources 10 and 20 connected in parallel. In the series connection mode, DC voltage conversion for controlling output voltage Vo of power line PL is executed with DC power sources 10 and 20 connected in series. The parallel connection mode corresponds to the "first operation mode" and the series connection mode corresponds to the "second connection mode."

(Basic Circuit Operation in Each Operation Mode)

Basic circuit operation in each operation mode of power converter 50 will be described. First, the operation in the parallel connection mode of power converter 50 will be described.

Again referring to FIG. 1, between DC power source 10 and power line PL, a first step-up chopper circuit, having upper arm element Su of FIG. 2 formed by switching elements S1 and S2 and lower arm element Sl of FIG. 2 formed by switching elements S3 and S4, is provided.

Similarly, between DC power source 20 and power line PL, a second step-up chopper circuit, having lower arm element Sl of FIG. 2 formed by switching elements S2 and S3 and upper arm element Su of FIG. 2 formed by switching elements S1 and S4, is provided.

In this manner, both the first and second step-up chopper circuits are formed by switching elements S1 to S4. In other words, it is understood that each of the switching elements S1 to S4 is arranged to be included in the power conversion path of power source 10 and power line PL realized by the first step-up chopper circuit and the power conversion path between DC power source 20 and power line PL realized by the second chopper circuit.

As shown in FIGS. 4 and 5, by turning on the switching element S4 or S2, it is possible to connect DC power sources 10 and 20 in parallel with power line PL. Here, in the parallel connection mode, equivalent circuit will differ depending on which is higher between the voltage V[1] of DC power source 10 and the voltage V[2] of DC power source 20.

As shown at (a) of FIG. 4, when V[2]>V[1], by turning on the switching element S4, DC power sources 10 and 20 are connected in parallel through switching elements S2 and S3. The equivalent circuit at this time is as shown at (b) of FIG. 4.

Referring to (b) of FIG. 4, between DC power source 10 and power line PL, by on/off control of switching element S3, the on-period of lower arm element and the on-period of upper arm element shown at (a) and (b) of FIG. 3 can be formed alternately. Similarly, between DC power source 20 and power line PL, by common on/off control of switching elements S2 and S3, the on-period of lower arm element and the on-period of upper arm element shown at (a) and (b) of FIG. 3 can be formed alternately. Switching element S1 operates as a switch for controlling regeneration from load 30.

On the other hand, as shown at (a) of FIG. 5, when V[1]>V[2], by turning on the switching element S2, DC power sources 10 and 20 are connected in parallel through switching elements S3 and S4. The equivalent circuit at this time is as shown at (b) of FIG. 5.

Referring to (b) of FIG. 5, between DC power source 20 and power line PL, by on/off control of switching element S3, the on-period of lower arm element and the on-period of upper arm element shown at (a) and (b) of FIG. 3 can be formed alternately. Similarly, between DC power source 10 and power line PL, by common on/off control of switching elements S3 and S4, the on-period of lower arm element and the on-period of upper arm element shown at (a) and (b) of FIG. 3 can be formed alternately. Switching element S1 operates as a switch for controlling regeneration from load 30.

In the circuit operation shown in FIGS. 4 and 5, a path for discharging the energy stored in reactors L1 and L2 must be provided in any situation. The reason for this is that when the reactors through which different currents are flowing are connected in series through a switching element, relation between the stored energy and the current contradicts, possibly resulting in generation of a spark and eventually in circuit breakdown. Therefore, it is necessary to always provide recirculation paths for discharging the energy stored in reactors L1 and L2 in the circuit.

FIG. 6 shows recirculation paths for reactors at the time of circuit operation shown in FIG. 4 (parallel connection mode with V[2]>V[1]). FIG. 6 shows a recirculation path for reactor L1 at (a), and a recirculation path for reactor L2 at (b).

Referring to (a) of FIG. 6, in the equivalent circuit shown at (b) of FIG. 4, the current of reactor L1 in the power running state can be re-circulated through a current path 102 passing through diodes D2 and D1, power line PL, load 30 and ground line GL. Further, the current of reactor L1 in the regenerating state can be re-circulated through a current path 103 passing through a diode D3. By current paths 102 and 103, the energy stored in reactor L1 can be discharged.

Referring to (b) of FIG. 6, in the equivalent circuit shown at (b) of FIG. 4, the current of reactor L2 in the power running state can be re-circulated through a current path 104 passing through diode D1, power line PL, load 30 and ground line GL. Further, the current of reactor L2 in the regenerating state can be re-circulated through a current path 105 passing through diodes D3 and D2. By current paths 104 and 105, the energy stored in reactor L2 can be discharged.

FIG. 7 shows recirculation paths for reactors at the time of circuit operation shown in FIG. 5 (parallel connection mode with V[1]>V[2]). FIG. 7 shows a recirculation path for reactor L1 at (a) and a recirculation path for reactor L2 at (b).

Referring to (a) of FIG. 7, in the equivalent circuit shown at (b) of FIG. 5, the current of reactor L1 in the power running state can be re-circulated through a current path 106 passing through diode D1, power line PL, load 30 and ground line GL. Further, the current of reactor L1 in the regenerating state can be re-circulated through a current path 107 passing through diodes D4 and D3. By current paths 106 and 107, the energy stored in reactor L1 can be discharged.

Referring to (b) of FIG. 7, in the equivalent circuit shown at (b) of FIG. 5, the current of reactor L2 in the power running state can be re-circulated through a current path 108 passing through diode D1, power line PL, load 30, ground line GL and diode D4. Further, the current of reactor L2 in the regenerating state can be re-circulated through a current path 109 passing through diode D3. By current paths 108 and 109, the energy stored in reactor L2 can be discharged.

As described above, in voltage converter 50, in any operation state during the operation in parallel connection mode, the recirculation paths for discharging energy stored in reactors L1 and L2 are ensured.

Next, referring to FIGS. 8 and 9, the operation of power converter 50 in the series connection mode will be described.

As shown at (a) of FIG. 8, by fixing on the switching element S3, DC power sources 10 and 20 can be connected in series to power line PL. The equivalent circuit at this time is as shown at (b) of FIG. 8.

Referring to (b) of FIG. 8, in the series connection mode, between the series-connected DC power sources 10 and 20 and load 30, by common on/off control of switching elements S2 and S3, the on-period of lower arm element and the on-period of upper arm element shown at (a) and (b) of FIG. 3 can be formed alternately. Switching element S1, which is turned on in the off-period of switching elements S2 and S3, operates as a switch for controlling regeneration from load 30. Further, by switching element S3 which is fixed on, a line 15 connecting reactor L1 to switching element S4 is equivalently formed.

In the circuit operation shown in FIG. 8 also, recirculation paths for discharging energy stored in reactors L1 and L2 must be provided, as described with reference to FIGS. 6 and 7.

FIG. 9 shows recirculation paths for reactors at the time of circuit operation shown in FIG. 8 (series connection mode). FIG. 9 shows a recirculation path in the power running state at (a) and a recirculation path in the regenerating state at (b).

Referring to (a) of FIG. 9, in the equivalent circuit shown at (b) of FIG. 8, the current of reactor L1 in the power running state can be re-circulated through a current path 111 passing through line 15, diodes D2 and D1, power line PL, load 30 and ground line GL. Further, the current of reactor L2 in the power running state can be re-circulated through a current path 112 passing through diode D1, power line PL, load 30, diode D4 and line 15. While switching elements S2 and S4 are turned on/off simultaneously, the same current flows through reactors L1 and L2 and, therefore, no current flows through line 15. As a result, no current flows through diodes D2 and D4.

Referring to (b) of FIG. 9, in the equivalent circuit shown at (b) of FIG. 8, the current of reactor L1 in the regenerating state can be re-circulated through a current path 113 passing through diode D4 and line 15. Similarly, the current of reactor L2 in the regenerating state can be re-circulated through a current path 114 passing through diode D2 and line 15. While switching elements S2 and S4 are turned on/off simultaneously, the same current flows through reactors L1 and L2 and, therefore, the same current flows through diodes D2 and D4. As a result, no current flows through line 15.

As described above, in voltage converter 50, both in the power running state and the regenerating state during the operation in series connection mode, the recirculation paths for discharging energy stored in reactors L1 and L2 are ensured.

In the following, the specific DC voltage converting operation by power converter 50 will be described in detail. First, referring to FIGS. 10 and 11, the voltage boosting (step-up) operation in the parallel connection mode will be described.

Figure 10:
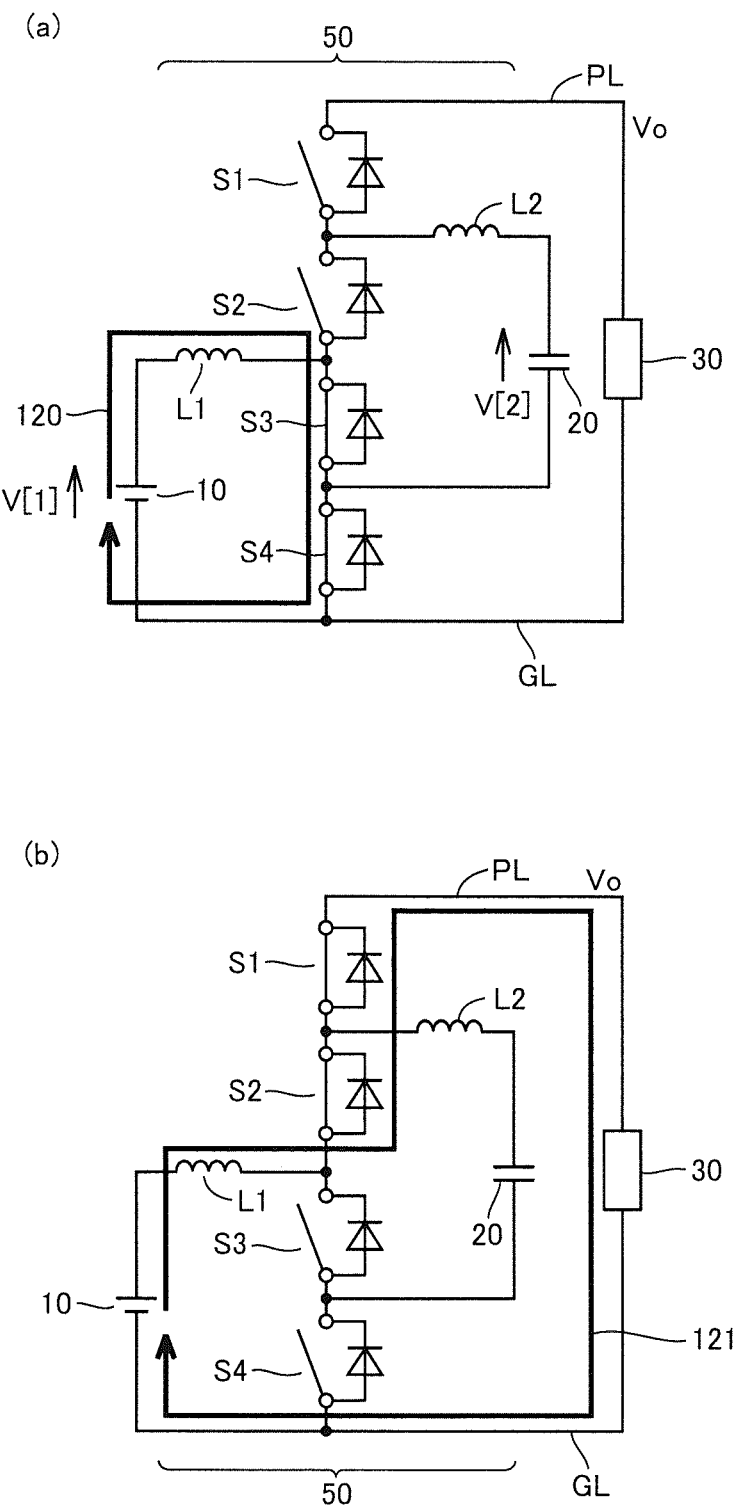
FIG. 10 includes circuit diagrams illustrating DC voltage conversion (step-up operation) for the first DC power source in the parallel connection mode.

FIG. 10 shows DC voltage conversion (step-up operation) for DC power source 10 in the parallel connection mode.

Referring to (a) of FIG. 10, by turning on a pair of switching elements S3 and S4 and by turning off a pair of switching elements S1 and S2, a current path 120 for storing energy in reactor L1 is formed. Thus, as at (a) of FIG. 3, a state in which the lower arm element of step-up chopper circuit is on is realized.

In contrast, referring to (b) of FIG. 10, by turning on the pair of switching elements S1 and S2 and by turning off the pair of switching elements S3 and S4, a current path 121 for outputting the energy stored in reactor L1 with the energy of DC power source 10 is formed. Thus, as at (b) of FIG. 3, a state in which the upper arm element of step-up chopper circuit is on is realized.

By alternately repeating the first period in which the pair of switching elements S3 and S4 is on and at least one of switching elements S1 and S2 is off and the second period in which the pair of switching elements S1 and S2 is on and at least one of switching elements S3 and S4 is off, current path 120 of (a) of FIG. 10 and current path 121 of (b) of FIG. 10 are formed alternately.

As a result, a step-up chopper circuit having the pair of switching elements S1 and S2 as an equivalent of upper arm element and the pair of switching elements S3 and S4 as an equivalent of lower arm element is formed for DC power source 10. In the DC voltage converting operation shown in FIG. 10, there is no current circulation path to DC power source 20 and, therefore, DC power sources 10 and 20 do not interfere with each other. Specifically, power input/output to and from DC power sources 10 and 20 can be controlled independently.

In such DC voltage conversion, the relation represented by Equation (2) below holds between the voltage V[1] of DC power source 10 and the output voltage Vo of power line PL. In Equation (2), Da represents the duty ratio of the first period in which the pair of switching elements S3 and S4 is on.

$$Vo=1/(1-Da) \times V[1] \qquad (2)$$

FIG. 11 shows DC voltage conversion (step-up operation) for DC power source 20 in the parallel connection mode.

Referring to (a) of FIG. 11, by turning on a pair of switching elements S2 and S3 and by turning off a pair of switching elements S1 and S4, a current path 130 for storing energy in reactor L2 is formed. Thus, as at (a) of FIG. 3, a state in which the lower arm element of step-up chopper circuit is on is realized.

In contrast, referring to (b) of FIG. 11, by turning on the pair of switching elements S1 and S4 and by turning off the pair of switching elements S2 and S3, a current path 131 for outputting the energy stored in reactor L2 with the energy of DC power source 20 is formed. Thus, as at (b) of FIG. 3, a state in which the upper arm element of step-up chopper circuit is on is realized.

By alternately repeating the first period in which the pair of switching elements S2 and S3 is on and at least one of switching elements S1 and S4 is off and the second period in which the pair of switching elements S1 and S4 is on and at least one of switching elements S2 and S3 is off, current path 130 of (a) of FIG. 11 and current path 131 of (b) of FIG. 11 are formed alternately.

As a result, a step-up chopper circuit having the pair of switching elements S1 and S4 as an equivalent of upper arm element and the pair of switching elements S2 and S3 as an equivalent of lower arm element is formed for DC power source 20. In the DC voltage converting operation shown in FIG. 11, there is no current circulation path to DC power source 10 and, therefore, DC power sources 10 and 20 do not interfere with each other. Specifically, power input/output to and from DC power sources 10 and 20 can be controlled independently.

In such DC voltage conversion, the relation represented by Equation (3) below holds between the voltage V[2] of DC power source 20 and the output voltage Vo of power line PL.

In Equation (3), Db represents the duty ratio of the first period in which the pair of switching elements S2 and S3 is on.

$$Vo=1/(1-Db)\times V[2] \quad (3)$$

Next, referring to FIG. 12, the DC voltage conversion (step-up operation) in the series connection mode will be described.

Referring to (a) of FIG. 12, switching element S3 is fixed on for connecting DC power sources 10 and 20 in series, the pair of switching elements S2 and S4 is turned on and switching element S1 is turned off. As a result, current paths 140 and 141 for storing energy in reactors L1 and L2 are formed. As a result, for the series-connected DC power sources 10 and 20, as at (a) of FIG. 3, a state in which the lower arm element of step-up chopper circuit is on is realized.

Referring to (b) of FIG. 12, while switching element S3 is kept fixed on, the pair of switching elements S2 and S4 is turned off and switching element S1 is turned on, in contrast to (a) of FIG. 12. Thus, a current path 142 is formed. By current path 142, the sum of energy from DC power sources 10 and 20 connected in series and the energy stored in reactors L1 and L2 is output to power line PL. As a result, for the series-connected DC power sources 10 and 20, as at (b) of FIG. 3, a state in which the upper arm element of step-up chopper circuit is on is realized.

With switching element S3 kept fixed on, by alternately repeating the first period in which the pair of switching elements S2 and S4 is on and switching element S1 is off and the second period in which switching element S1 is on and at least one of switching elements S2 and S4 is off, current paths 140 and 141 of (a) of FIG. 12 and current path 142 of (b) of FIG. 12 are formed alternately.

In the DC voltage conversion in the series connection mode, the relation represented by Equation (4) below holds among the voltage V[1] of DC power source 10, the voltage V[2] of DC power source 20 and the output voltage Vo of power line PL. In Equation (4), Dc represents the duty ratio of the first period in which the pair of switching elements S2 and S4 is on.

$$Vo=1/(1-Dc)\times(V[1]+V[2]) \quad (4)$$

It is noted, however, that if V[1] and V[2] are different or if reactors L1 and L2 have different inductances, reactors L1 and L2 come to have different current values at the end of operation shown at (a) of FIG. 12. Therefore, immediately after the transition to the operation shown at (b) of FIG. 12, if the current of reactor L1 is larger, a difference current flows through current path 143. If the current of reactor L2 is larger, a difference current flows through current path 144.

(Specific Control Operation in Each Operation Mode)

Next, specific control operation in each operation mode of power converter 50 will be described. First, referring to FIGS. 13 to 18, the control operation in the parallel connection mode will be described.

Figure 13:
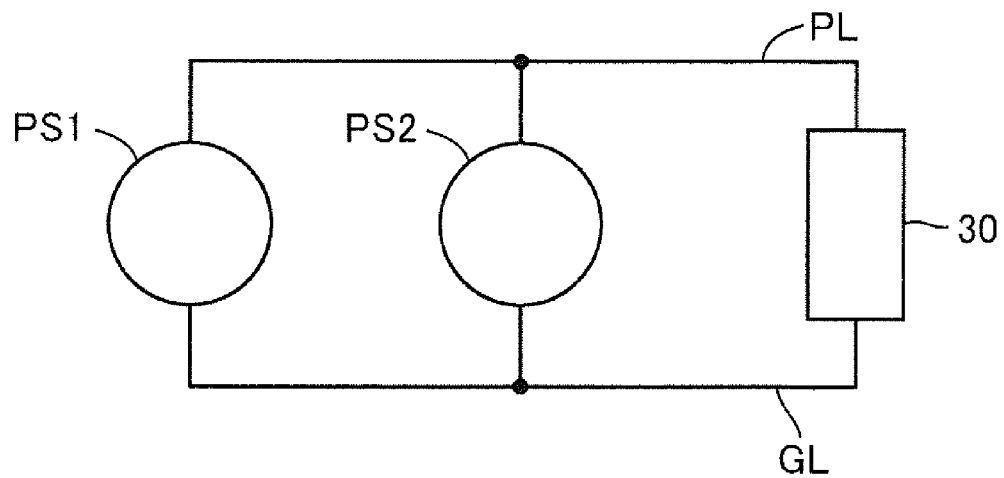
FIG. 13 is a block diagram showing an equivalent circuit viewed from the load side, in the parallel connection mode.

FIG. 13 shows an equivalent circuit viewed from the load side, in the parallel connection mode.

Referring to FIG. 13, in the parallel connection mode, a power source PS1 executing DC power conversion between DC power source 10 and load 30 and a power source PS2 executing DC power conversion between DC power source 20 and load 30 exchange power with load 30 in parallel. Power source PS1 corresponds to the step-up chopper circuit executing the DC voltage converting operation shown in FIG. 10. Similarly, power source PS2 corresponds to the step-up chopper circuit executing the DC voltage converting operation shown in FIG. 11.

Specifically, power source PS1 has the DC voltage converting function with the voltage conversion ratio represented by Equation (2), between the voltage V[1] of DC power source 10 and output voltage Vo. Similarly, power source PS2 has the DC voltage converting function with the voltage conversion ratio represented by Equation (3) between the voltage V[2] of DC power source 20 and the output voltage Vo.

In the parallel connection mode, if common control (voltage control of output voltage Vo) is simultaneously executed for both power sources, the power sources PS1 and PS2 come to be connected in parallel on the side of the load and, therefore, there is a possibility of circuit failure. Therefore, one of the power sources PS1 and PS2 operates as a voltage source controlling the output voltage Vo. The other one of the power sources PS1 and PS2 operates as a current source for regulating the current of the power source to a current command value. The voltage conversion ratio of each of the power sources PS1 and PS2 is controlled such that the power source operates as a voltage source or current source.

When the power sources are controlled such that power source PS1 operates as the current source and the power source PS2 operates as the voltage source, a relation represented by Equation (5) below holds among electric power P[1] of DC power source 10, electric power P[2] of DC power source 20, electric power Po of load 30 and a current command value Ii* of the current source.

$$P[2]=Po-P[1]=Po-V[1]\times Ii^* \quad (5)$$

By setting the current command value Ii* such that P*=V[1]×Ii* is kept constant in accordance with the detected value of voltage V[1] of DC power source 10, the electric power P[1] of DC power source 10 forming the current source can be regulated to the power command value Pi*.

In contrast, when the power sources are controlled such that power source PS2 operates as the current source and the power source PS1 operates as the voltage source, a relation represented by Equation (6) below holds.

$$P[1]=Po-P[2]=Po-V[2]\times Ii^* \quad (6)$$

Similarly, the electric power P[2] of DC power source 20 can also be regulated to the power command value Pi*, by setting the current command value Ii* such that P*=V[2]×Ii* is kept constant.

Figure 14:
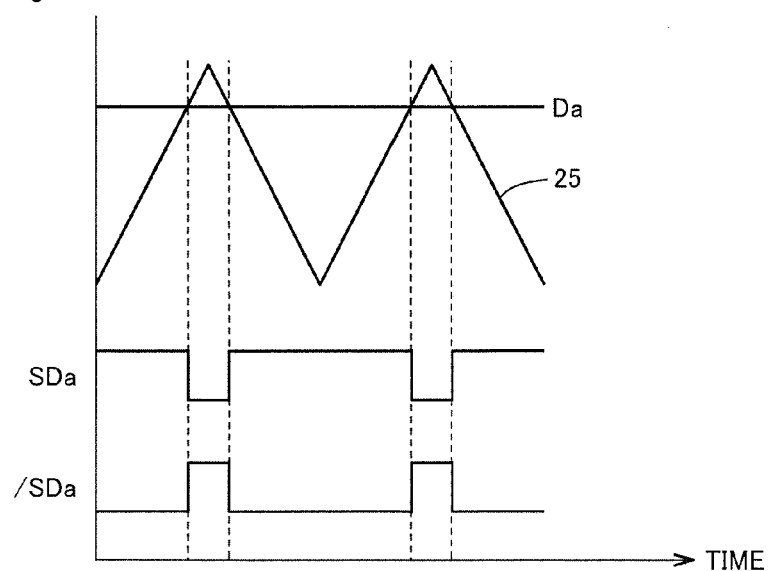
FIG. 14 is a diagram of waveforms representing an exemplary operation for controlling the first power source.

FIG. 14 is a diagram of waveforms representing a specific exemplary operation for controlling power source PS1 corresponding to DC power source 10.

Referring to FIG. 14, the duty ratio Da (see Equation (2)) of power source PS1 is calculated in accordance with voltage feedback control (FIG. 16) for the operation as the voltage source or in accordance with current feedback control (FIG. 17) for the operation as the current source. In FIG. 14, a voltage signal representing the duty ratio Da is represented by the same reference character Da.

A control pulse signal SDa of power source PS1 is generated by pulse width modulation (PWM) control based on a comparison between the duty ratio Da and a periodical carrier signal 25. Generally, a triangular wave is used for carrier signal 25. The period of carrier signal 25 corresponds to the switching frequency of each switching element, and the amplitude of carrier signal 25 is set to a voltage that corresponds to Da=1.0.

Control pulse signal SDa is set to a logic high level (hereinafter denoted as H level) if the voltage indicating the duty ratio Da is higher than the voltage of carrier signal 25, and set to the logic low level (hereinafter denoted as L level) if the voltage is lower than the voltage of carrier signal 25. A control pulse signal /SDa is an inversion signal of control pulse signal SDa. When duty ratio Da becomes higher, H level period of control pulse signal SDa becomes longer. When duty ratio Da becomes lower, L level period of control pulse signal SDa becomes longer.

Therefore, control pulse signal SDa corresponds to the signal for controlling on/off of the lower arm element of step-up chopper circuit shown in FIG. 10. Specifically, the lower arm element is turned on in the H level period, and the lower arm element is turned off in the L level period, of control pulse signal SDa. On the other hand, control pulse signal /SDa corresponds to the signal for controlling on/off of the upper arm element of step-up chopper circuit shown in FIG. 10.

Figure 15:
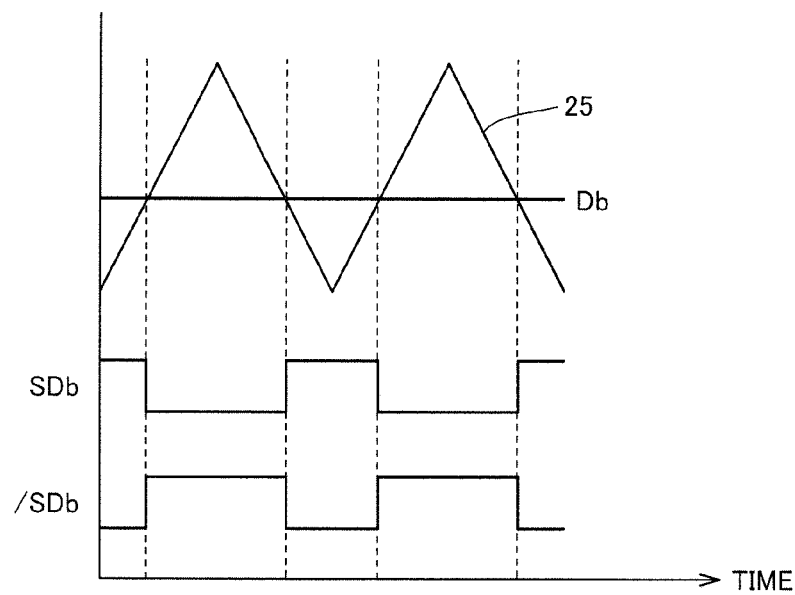
FIG. 15 is a diagram of waveforms representing an exemplary operation for controlling the second power source.

FIG. 15 is a diagram of waveforms representing a specific exemplary operation for controlling power source PS2 corresponding to DC power source 20.

Referring to FIG. 15, in power source PS2 also, by the pulse width modulation control similar to that for power source PS1, a control pulse signal SDb and its inversion signal /SDb are generated, based on the duty ratio Db (see Equation (3)). Specifically, when duty ratio Db becomes higher, the H level period of control pulse signal SDb becomes longer. On the contrary, when duty ratio Db becomes lower, the L level period of control pulse signal SDb becomes longer.

Therefore, control pulse signal SDb corresponds to the signal for controlling on/off of the lower arm element of step-up chopper circuit shown in FIG. 11. Control pulse signal /SDb corresponds to the signal for controlling on/off of the upper arm element of step-up chopper circuit shown in FIG. 11.

Duty ratio Db is calculated in accordance with current feedback control (FIG. 17) for the power source PS2 to operate as a current source if power source PS1 operates as a voltage source. On the contrary, duty ratio Db is calculated in accordance with voltage feedback control (FIG. 16) for the power source PS2 to operate as a voltage source if power source PS1 operates as a current source.

Figure 16:
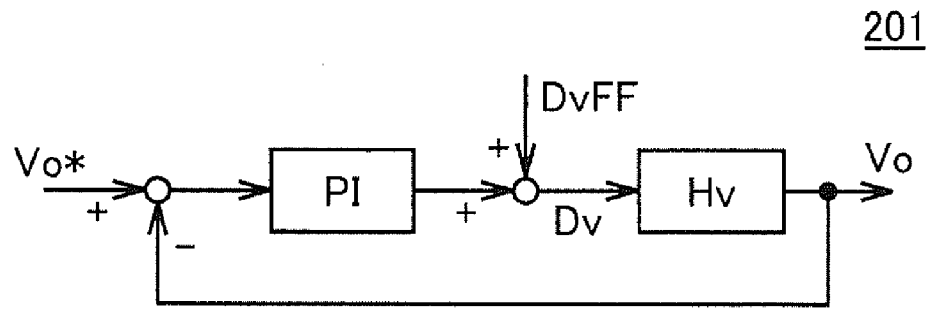
FIG. 16 shows an exemplary configuration of a control block for a power source operating as a voltage source.

FIG. 16 shows an exemplary configuration of a control block 201 for a power source operating as a voltage source.

Referring to FIG. 16, control block 201 generates a duty ratio command value Dv for voltage control, in accordance with a sum of a feedback control amount obtained by PI (proportional integral) operation of the difference between voltage command value Vo* of output voltage Vo and output voltage Vo and a feed-forward control amount DvFF. A transfer function Hv corresponds to a transfer function of power source PS1 or PS2 operating as a voltage source.

Figure 17:
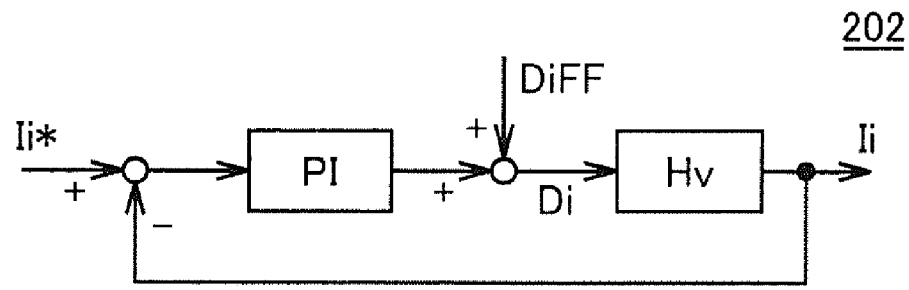
FIG. 17 shows an exemplary configuration of a control block for a power source operating as a current source.

FIG. 17 shows an exemplary configuration of a control block 202 for a power source operating as a current source.

Referring to FIG. 17, control block 202 generates a duty ratio command value Di for current control, in accordance with a sum of a feedback control amount obtained by PI (proportional integral) operation of a difference between the current command value Ii* and the current Ii of current-controlled DC power source 10 or 20, and a feed-forward control amount DiFF. A transfer function Hi corresponds to the transfer function of power source PS2 or PS1 operating as a current source.

Figures 18, 19:
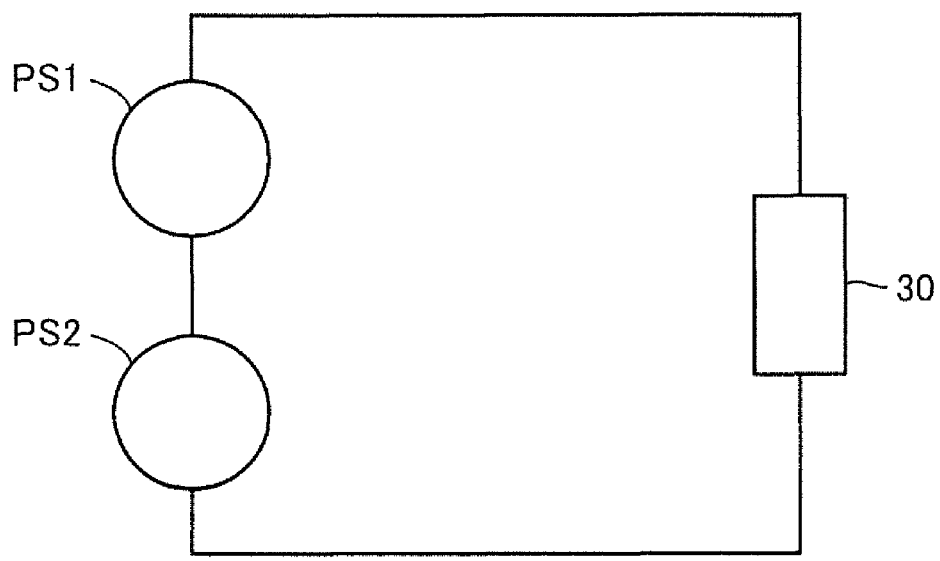
FIG. 18 is a table showing settings of various control data in the parallel connection mode.
FIG. 19 is a block diagram showing an equivalent circuit viewed from the load side in the series connection mode.

FIG. 18 shows settings of various control data in the parallel connection mode. The left column of the table shown in FIG. 18 shows settings of various control data when power source PS1 (DC power source 10) is used as the current source and power source PS2 (DC power source 20) is used as the voltage source.

Referring to the left side of FIG. 18, the duty ratio command value Dv for voltage control is used as duty ratio Db of power source PS2 (DC power source 20), and duty ratio command value Di for current control is used as duty ratio Da of power source PS1 (DC power source 10). The current Ii controlled by the current control is the current I[1] of DC power source 10. The voltage controlled by the voltage control is output voltage Vo, no matter which of power sources PS1 and PS2 is used as the voltage source.

The transfer function Hv in FIG. 16 corresponds to the transfer function of step-up chopper circuit corresponding to DC power source 20 shown in FIG. 11. Further, the transfer function Hi in FIG. 17 corresponds to the transfer function of step-up chopper circuit corresponding to DC power source 10 shown in FIG. 10.

A feed-forward control amount DvFF in the voltage control is set in accordance with a voltage difference between the output voltage Vo and the voltage V[2] of DC power source 20, as represented by (7) below. Further, a feed-forward control amount DiFF for the current control is set in accordance with a voltage difference between the output voltage Vo and the voltage V[1] of DC power source 10, as represented by (8) below.

$$DvFF=(Vo-V[2])/Vo \quad (7)$$

$$DiFF=(Vo-V[1])/Vo \quad (8)$$

In accordance with the duty ratio Da (Da=Di), control pulse signals SDa and /SDa shown in FIG. 14 are generated. Similarly, in accordance with the duty ratio Db (Db=Dv), control pulse signals SDb and /SDb shown in FIG. 15 are generated.

Control signals SG1 to SG4 for controlling on/off of switching elements S1 to S4, respectively, are set in accordance with logical sum of control pulse signal for current control of power source PS1 and control pulse signal for voltage control of power source PS2.

Switching element S1 forms the upper arm element in each of the step-up chopper circuits shown in FIGS. 10 and 11. Therefore, control signal SG1 controlling on/off of switching element S1 is generated by the logical sum of control pulse signals /SDa and /SDb. Specifically, control signal SG1 is set to the H level in a period in which at least one of control pulse signals /SDa and /SDb is at the H level. Control signal SG1 is set to the L level in a period in which control pulse signals /SDa and /SDb are both at the L level.

As a result, switching element S1 is on/off controlled such that it realizes the function of upper arm element of step-up chopper circuit (DC power source 10) shown in FIG. 10 as well as the function of upper arm element of step-up chopper circuit (DC power source 20) shown in FIG. 11.

Switching element S2 forms the upper arm element in step-up chopper circuit of FIG. 10 and forms the lower arm element in step-up chopper circuit of FIG. 11. Therefore, control signal SG2 controlling on/off of switching element S2 is generated in accordance with the logical sum of control pulse signals /SDa and SDb. Specifically, control signal SG2 is set to the H level in a period in which at least one of control pulse signals /SDa and SDb is at the H level. Control signal SG2 is set to the L level in a period in which control pulse signals /SDa and SDb are both at the L level. As a result, switching element S2 is on/off controlled such that it realizes the function of upper arm element of step-up chopper circuit (DC power source 10) of FIG. 10 as well as the function of lower arm element of step-up chopper circuit (DC power source 20) of FIG. 11.

Similarly, control signal SG3 for switching element S3 is generated in accordance with the logical sum of control pulse signals SDa and SDb. Thus, switching element S3 is on/off controlled such that it realizes the function of lower arm element of step-up chopper circuit (DC power source 10) of FIG. 10 as well as the function of lower arm element of step-up chopper circuit (DC power source 20) of FIG. 11.

Further, control signal SG4 for switching element S4 is generated in accordance with the logical sum of control pulse signals SDa and /SDb. Thus, switching element S4 is on/off controlled such that it realizes the function of lower arm element of step-up chopper circuit (DC power source 10) of FIG. 10 as well as the function of upper arm element of step-up chopper circuit (DC power source 20) of FIG. 11.

The right column of the table shown in FIG. 18 shows settings of various control data when power source PS1 (DC power source 10) is used as a voltage source and power source PS2 (DC power source 20) is used as a current source.

Referring to the right column of FIG. 18, the duty ratio command value Dv for voltage control is used as the duty ratio Da for power source PS1 (DC power source 10), and the duty ratio command value Di for current control is used as the duty ratio Db for power source PS2 (DC power source 20). The current Ii controlled by the current control is the current I[2] of DC power source 20. The voltage controlled by the voltage control is the output voltage Vo.

The transfer function Hv in FIG. 16 corresponds to the transfer function of step-up chopper circuit corresponding to DC power source 10 shown in FIG. 10. Further, transfer function Hi in FIG. 17 corresponds to the transfer function of step-up chopper circuit corresponding to DC power source 20 shown in FIG. 11.

The feed-forward control amount DvFF in the voltage control is set in accordance with a voltage difference between the output voltage Vo and the voltage V[1] of DC power source 10 as represented by (9) below. Further, the feed-forward control amount DiFF in the current control is set in accordance with a voltage difference between the output voltage Vo and the voltage V[2] of DC power source 20.

$$DvFF=(Vo-V[1])/Vo \quad (9)$$

$$DiFF=(Vo-V[2])/Vo \quad (10)$$

In accordance with the duty ratio Da (Da=Dv), the control pulse signals SDa and /SDa shown in FIG. 14 are generated. Similarly, in accordance with the duty ratio Db (Db=Di), the control pulse signals SDb and /SDb shown in FIG. 15 are generated.

Control signals SG1 to SG4 for controlling on/off of switching elements S1 to S4, respectively, are set in accordance with logical sum of control pulse signal for voltage control of power source PS1 and control pulse signal for current control of power source PS2. Therefore, control signals SG1 to SG4 for switching elements S1 to S4 are generated in the same manner as indicated on the left column of FIG. 18.

In the parallel connection mode, control signals SG2 and SG4 are set to complementary levels and, therefore, switching elements S2 and S4 are turned on/off in complementary manner. Accordingly, the operation when V[2]>V[1] shown in FIG. 4 and the operation when V[1]>V[2] shown in FIG. 5 are switched naturally. Further, in each operation, switching elements S1 and S3 are switched complementarily and, therefore, DC voltage conversion in accordance with the duty ratios Da and Db can be executed in power sources PS1 and PS2, respectively.

Next, using FIGS. 19 to 22, the control operation in the series connection mode will be described.

FIG. 19 shows an equivalent circuit viewed from the load side in the series connection mode.

Referring to FIG. 19, in the series connection mode, power sources PS1 and PS2 are connected in series to load 30. Therefore, the current flowing through power sources PS1 and PS2 is common. Accordingly, in order to control output voltage Vo, it is necessary that power sources PS1 and PS2 are commonly voltage-controlled.

Series-connected power sources PS1 and PS2 correspond to the step-up chopper circuit executing the DC voltage converting operation shown in FIG. 12. Specifically, power sources PS1 and PS2 have a function of Dc voltage conversion with the voltage conversion ratio represented by Equation (4), between the sum of voltages V[1] and V[2] of DC power sources 10 and 20 and the output voltage Vo.

In the series connection mode, electric power P[1] of DC power source 10 and electric power P[2] of DC power source 20 cannot directly be controlled. Between electric power P[1] and voltage V[1] of DC power source 10 and the electric power P[2] and voltage V[2] of DC power source 20, a relation represented by Equation (11) below holds. It s noted that, as in the parallel connection mode, the sum of electric powers P[1] and P[2] constitutes the electric power Po of load 30 (Po=P[1]+P[2]).

$$P[1]:P[2]=V[1]:V[2] \quad (11)$$

Referring to FIG. 20, a duty ratio Dc (see Equation (4)) common to power sources PS1 and PS2 is calculated by a voltage feedback control (FIG. 21) for the operation of a voltage source. In FIG. 20, a voltage signal representing the duty ratio Dc is denoted by the same reference character Dc.

Control pulse signal SDc is generated by pulse width modulation control similar to that shown in FIGS. 14 and 15, based on the duty ratio Dc (see Equation (4)). A control pulse signal /SDc is an inversion signal of control pulse signal SDc. When duty ratio Dc becomes higher, the H level period of control pulse signal SDc becomes longer. On the contrary, when the duty ratio Dc becomes lower, the L level period of control pulse signal SDc becomes longer.

Therefore, control pulse signal SDc corresponds to the signal controlling on/off of the lower arm element of step-up chopper circuit shown in FIG. 12. On the other hand, control pulse signal /SDc corresponds to the signal controlling on/off of the upper arm element of step-up chopper circuit shown in FIG. 12.

FIG. 21 shows an exemplary configuration of a control block 203 in the series connection mode.

Referring to FIG. 21, control block 203 generates a duty ratio command value Dv for voltage control, in accordance with a sum of feedback control amount obtained by PI (proportional integral) operation of a difference between the voltage command value Vo* of the output voltage Vo and the output voltage Vo and a feed-forward control value DvFF. The transfer function Hv corresponds to the transfer function of series-connected power sources PS1 and PS2.

FIG. 22 shows settings of various control data in the series connection mode.

Referring to FIG. 22, the duty ratio command value Dv for voltage control shown in FIG. 21 is used as the duty ratio Dc. The voltage controlled by the voltage control is the output voltage Vo. The transfer function Hv in FIG. 21 corresponds to the transfer function of step-up chopper circuit shown in FIG. 12. Further, feed-forward control amount DvFF is set in accordance with a voltage difference between the series-connected power source voltages V[1]+V[2] and the output voltage Vo, as represented by Equation (12) below.

$$DvFF=(Vo-(V[2]+V[1]))/Vo \qquad (12)$$

In accordance with the duty ratio Dc (Dc=Dv), control pulse signals SDc and /SDc shown in FIG. 20 are generated.

Control signals SG1 to SG4 for controlling on/off of switching elements S1 to S4, respectively, are set in accordance with control pulse signals SDc and /SDc, for controlling the step-up chopper circuit shown in FIG. 12.

In the series connection mode, by fixing on the switching element S3, DC power sources 10 and 20 are connected in series. Therefore, control signal SG3 is fixed at the H level.

Switching element S1 forms the upper arm element in the step-up chopper circuit shown in FIG. 12. Therefore, control pulse signal /SDc is used as control signal SG1. Further, switching elements S2 and S4 form the lower arm element in the step-up chopper circuit of FIG. 12. Therefore, control pulse signal SDc is used as control signals SG2 and SG4.

Next, an exemplary configuration and operation of the power supply system, to which power supply system 5 of the present embodiment is specifically applied, will be described.

Figure 23:
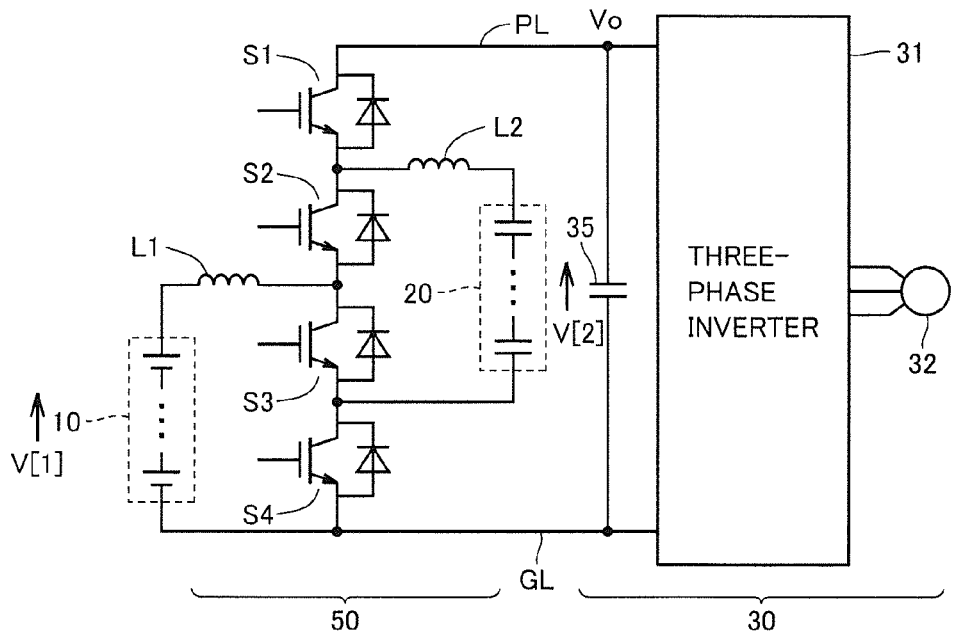
FIG. 23 is a circuit diagram showing an exemplary configuration of a power supply system to which the power supply system in accordance with an embodiment of the present invention is applied.

FIG. 23 is a circuit diagram showing an exemplary configuration of a power supply system to which the power supply system in accordance with an embodiment of the present invention is applied.

Referring to FIG. 23, a battery assembly having a plurality of battery cells connected in series is used as DC power source 10. Further, a plurality of series-connected electric double-layer capacitors is used as DC power source 20. Further, between power line PL to which a DC voltage from power converter 50 is output and ground line GL, a smoothing capacitor 35 is provided.

Load 30 includes a three-phase inverter 31 for converting DC voltage Vo on power line PL to a three-phase AC voltage, and a motor generator 32 receiving the three-phase AC voltage from three-phase inverter 31 for operation. By way of example, motor generator 32 is formed by a traction motor mounted, for example, on an electric vehicle or a hybrid vehicle. Specifically, motor generator 32 executes power regeneration at the time of deceleration of an electric vehicle or a hybrid vehicle. When motor generator 32 operates to generate power, three-phase inverter 31 converts the three-phase AC electric power generated by motor generator 32 to DC electric power and outputs it to power line PL. By the DC electric power, DC power source 10 and/or DC power source 20 can be charged.

In the exemplary configuration of FIG. 23, it is preferred that DC power source 10 formed of a secondary battery is used as a main power supply source, and DC power source 20 formed of electric double-layer capacitors is used as a sub power supply source. Therefore, in the parallel connection mode, in order to prevent overcharge or over-discharge of secondary battery by controlling electric power of DC power source 10, DC power source 10 is subjected to current control. DC power source 20 is subjected to voltage control.

Figure 24:
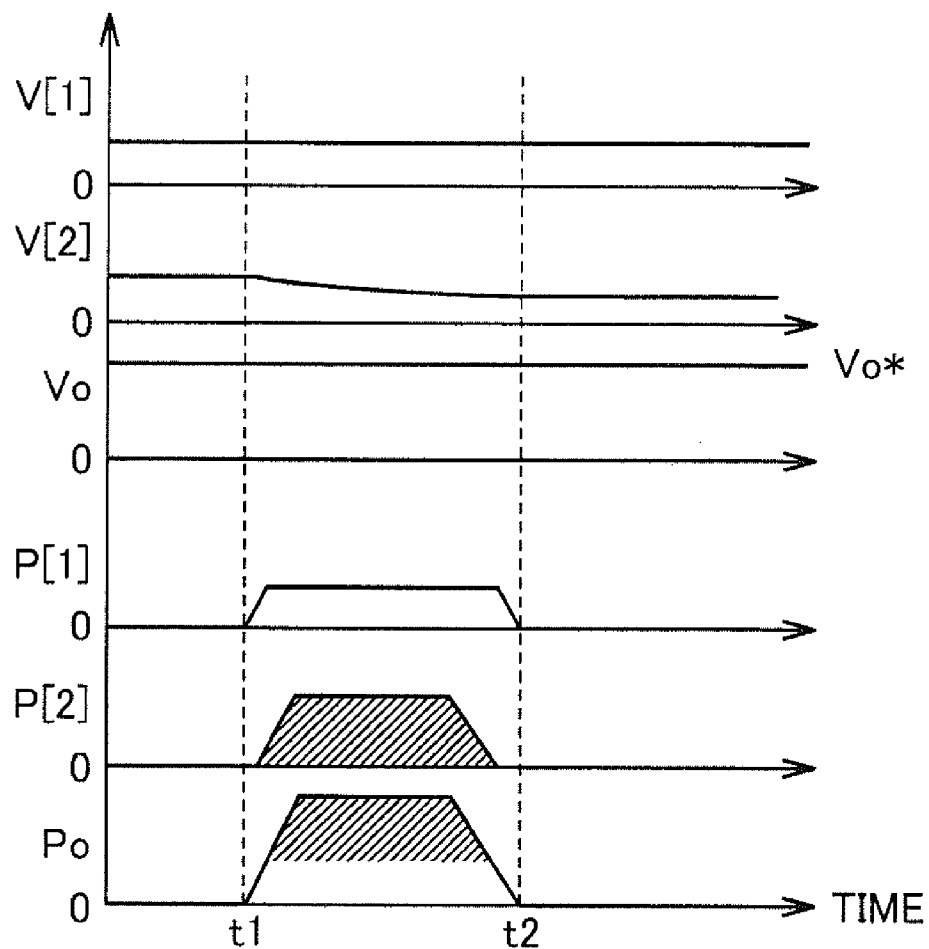
FIG. 24 is a diagram of waveforms representing an exemplary control operation in the parallel connection mode in the power supply system shown in FIG. 23.

FIG. 24 shows an exemplary control operation in the parallel connection mode.

Referring to FIG. 24, in the parallel connection mode, output voltage Vo is maintained at voltage command value Vo* by the voltage control and current control shown in FIGS. 16 and 17. Assume that between time points t1 and t2, electric power Po is consumed by load 30 (motor generator 32).

Here, the electric power P[1] of DC power source 10 subjected to current control is regulated substantially at a constant value in accordance with the current command value I* (power command value). Further, the voltage V[1] of DC power source 10 formed of secondary battery does not significantly change in a short time period.

Since DC power source 20 is subjected to voltage control, electric power covering shortage of electric power P[1] of DC power source 10 for the electric power Po of load 30 is supplied from DC power source 20, so as to maintain the output voltage Vo at the voltage command value Vo*.

The voltage V[2] of DC power source 20 formed of electric double layer capacitors changes with high sensitivity in accordance with charge/discharge. Specifically, it is known that a relation Ec=(½)×C×Vc×Vc holds among electric energy Ec of electric double layer capacitor, capacitance C of the capacitor and the voltage Vc of the capacitor. Therefore, as the electric power P[2] (P[2]=Po−P[1]) is output from DC power source 20, the electric power P[2] of DC power source 20 decreases.

In this manner, in the parallel connection mode, the output voltage Vo is controlled in accordance with the voltage command value Vo*, and electric power can be exchanged between load 30 and DC power sources 10 and 20 in parallel. Therefore, even if it is difficult to ensure the output from one DC power source (for example, when the temperature is very low), the energy necessary for load 30 can be supplied. Further, since electric powers of DC power sources 10 and 20 can be controlled independently, the electric power of each of DC power sources 10 and 20 can more precisely be managed. Specifically, each of DC power sources 10 and 20 can be used with higher safety. Further, since DC power sources 10 and 20 can be controlled independently, it becomes possible to exchange electric power between DC power sources 10 and 20. As a result, it is possible, for example, to precharge one of the DC power sources 10 and 20 using the other one of the power sources, through power line PL before starting the operation of load 30.

Though not shown, in the regenerative state with load 30 (motor generator 32) generating electric power, electric power distribution control to maintain the electric power P[1] charged to DC power source 10 at a constant value by current control and to receive remaining electric power by DC power source 20 can be realized simultaneously with the control of output voltage Vo.

Figure 25:
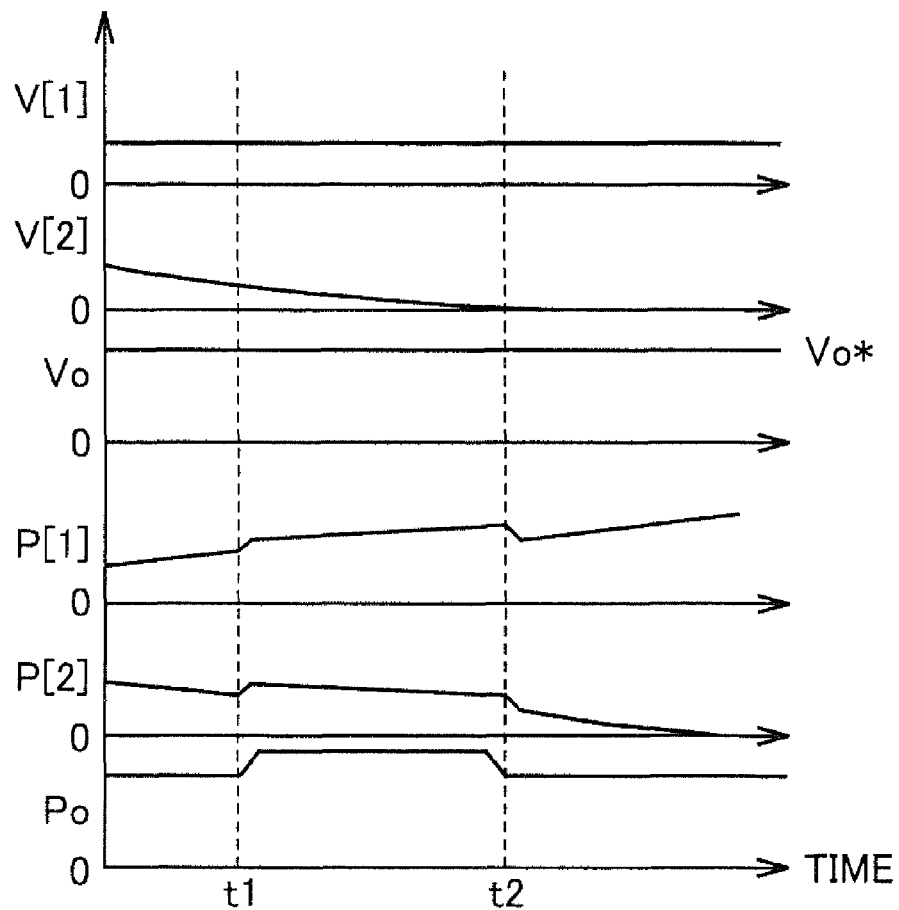
FIG. 25 is a diagram of waveforms representing an exemplary control operation in the series connection mode in the power supply system shown in FIG. 23.

FIG. 25 shows an exemplary control operation in the series connection mode. In FIG. 25 also, it is assumed that between time points t1 and t2, electric power Po is consumed by load 30 (motor generator 32).

Referring to FIG. 25, in the series connection mode, the current of DC power sources 10 and 20 is common. Therefore, as represented by Equation (11), between DC power sources 10 and 20, the ratio between powers P[1] and P[2] is determined in accordance with the ratio of voltages V[1] and V[2].

Between time points t1 and t2, the voltage V[2] of DC power source 20 formed of capacitors significantly lowers as the energy is discharged. Therefore, voltage control takes place such that electric power P[1] of DC power source 10 increases as the voltage V[2] of DC power source 20 decreases. Consequently, even in the period between t1 and t2, the output voltage Vo can be maintained at the voltage command value Vo*.

As shown in FIG. 25, since DC power sources 10 and 20 are connected in series, it becomes possible to use up the energy stored in one of the DC power sources (DC power source 20). The reason for this is that since the duty ratio Dc in the series connection mode is set in accordance with the ratio of voltages V[1]+V[2] to the output voltage Vo, its value will not be very large even if the voltage of one of the DC power sources decreases.

In contrast, in the parallel connection mode, the duty ratios Da and Db are set in accordance with the ratio of output voltage Vo to voltage V[1] or V[2]. Therefore, if the voltage of one DC power source lowers, it will be a value close to 1.0. In actual control of a step-up chopper circuit, a dead time must be provided to reliably prevent the upper and lower arm elements from being simultaneously turned on. Therefore, practically possible duty ratios Da and Db each have an upper limit. Therefore, where only the parallel mode is available, the voltage control fails if the voltage of one of the DC power sources lowers to a certain level. Specifically, from the viewpoint of using up the energy stored in DC power sources 10 and 20, there is a limit in the parallel connection mode. Therefore, from the viewpoint of using up the energy stored in DC power sources 10 and 20, the series connection mode is more advantageous than the parallel connection mode.

Further, in the series connection mode, provided that the electric power Po of load 30 is the same, the current flowing through switching elements S1 to S4 in power converter 5 is lower than in the parallel connection mode. The reason for this is that in the series connection mode, DC voltage conversion of voltages V[1]+V[2] is executed by the series connection, while in the parallel connection mode, the sum of current resulting from DC voltage conversion of voltage V[1] and current resulting from DC voltage conversion of voltage V[2] flows through each of the switching elements. Therefore, in the series connection mode, power loss at the switching elements can be lowered and, hence, efficiency can be improved. Further, in the series connection mode, it is possible to control the output voltage Vo without any influence of fluctuation in voltages V[1] and V[2] that occurs during power exchange between load 30 and DC power sources 10 and 20.

As described above, in the power supply system in accordance with the present embodiment, by controlling a plurality of switching elements S1 to S4, the mode in which two DC power sources 10 and 20 are connected in parallel and the mode in which the power sources are connected in series can be used selectively. As a result, it becomes possible to selectively use the parallel connection having improved response to load power (supply of electric power to be consumed and reception of generated electric power) and improved manageability of electric power and the series connection having higher efficiency and allowing higher usability of stored energy. Therefore, the two DC power sources 10 and 20 can effectively be utilized.

(Modification of Power Supply System)

Figure 26:
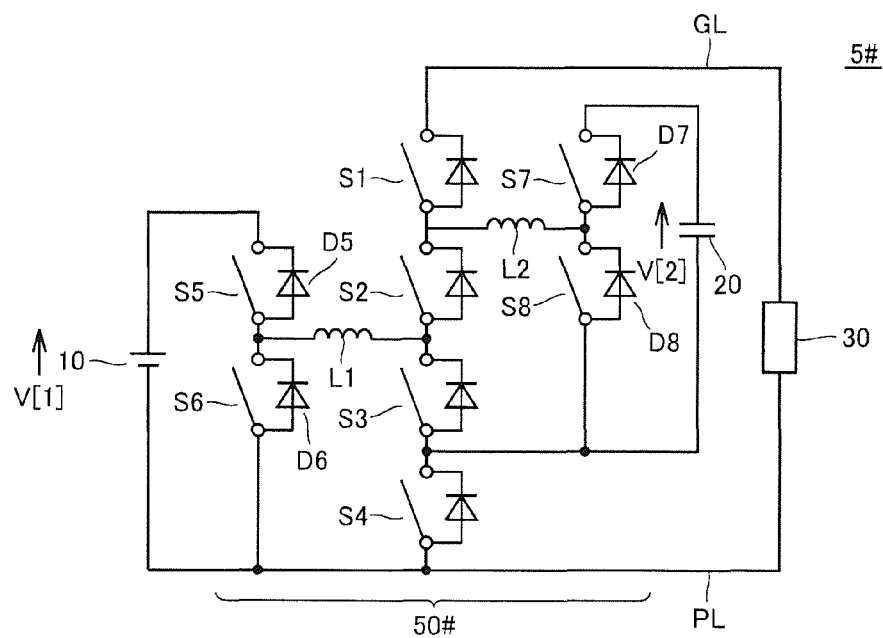
FIG. 26 is a circuit diagram showing a configuration of the power supply system in accordance with a modification of an embodiment of the present invention.

FIG. 26 is a circuit diagram showing a configuration of the power supply system in accordance with a modification of an embodiment of the present invention.

Referring to FIG. 26, a power supply system 5# in accordance with a modification of the embodiment differs from power supply system 5 shown in FIG. 1 in that it includes a power converter 50# in place of power converter 50. Different from power converter 50 shown in FIG. 1, power converter 50# additionally includes switching elements S5 to S8. For switching elements S5 to S8, corresponding anti-parallel diodes D5 to D8 are provided, respectively.

Figures 27, 28, 29:
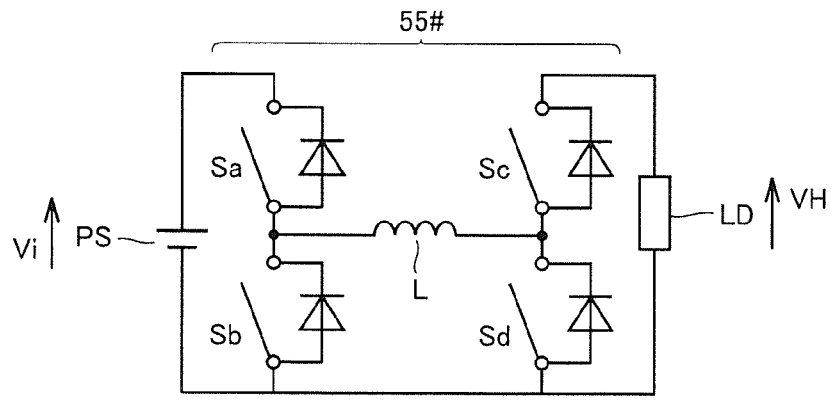
FIG. 27 is a circuit diagram showing a configuration of a bridge type converter incorporated in the power supply system shown in FIG. 26.
FIG. 28 is a table representing a switching operation in the direct voltage up/down mode of the bridge type converter.
FIG. 29 is a table representing a switching operation in the indirect voltage up/down mode of the bridge type converter.

Power converter 50# is a combination of power converter 50 and a bridge type converter 55# shown in FIG. 27.

Referring to FIG. 27, bridge type converter 55# has switching elements Sa to Sd for forming a full bridge, connected between a DC power source and a load LD. Switching element Sa forms an upper arm element on the power source side, and switching element Sb forms a lower arm element on the power source side. Switching element Sc forms an upper arm element on the load side, and switching element Sd forms a lower arm element on the load side. Between a node of switching elements Sa and Sb and a node of switching elements Sc and Sd, a reactor L is electrically connected.

In bridge type converter 55#, it is possible to selectively apply a direct voltage up/down mode in which switching can be controlled commonly in the voltage boosting (step-up) operation (VH>Vi) and the voltage lowering (step-down) operation (VH<Vi) from power source PS to load LD and an indirect voltage up/down mode in which the switching operation is changed in the step-up operation and in the step-down operation.

Referring to FIG. 28, in the direct voltage up/down mode, a pair of switching elements Sa and Sd and a pair of switching elements Sb and Sc are turned on/off alternately in complementary manner. Therefore, if we represent the ratio of on-periods (duty ratio) of the pair of switching elements Sa and Sd by D, the duty ratio of the pair of switching elements Sb and Sc will be (1−D). The voltage conversion ratio (VH/Vi) here is given as D/(1−D) and, therefore, the voltage conversion by bridge type converter 55# can be represented by Equation (13) below.

$$VH=D/(1-D)\times Vi \tag{13}$$

From Equation (13), it is understood that when D<0.5, VH<Vi (voltage lowered), and when D>0.5, VH>Vi (voltage boosted). Specifically, common switching control using duty ratio D can be applied both to step-up and step-down operations.

Referring to FIG. 29, in the indirect voltage up/down mode, the switching operation is changed at the time of step-up and step-down.

At the time of step-up operation, in the arm on the power source side, switching element Sa as the upper arm element is fixed on, while switching element Sb as the lower arm element is fixed off. In contrast, in the arm on the load side, switching elements Sc and Sd are turned on/off alternately in complementary manner. Therefore, when we represent the duty ratio of switching element Sd as the lower arm element by D, the duty ratio of switching element Sc as the upper arm element will be (1−D).

Accordingly, bridge type converter 55# operates as a step-up chopper circuit and, here the voltage conversion ratio (VH/Vi) will be 1/(1−D). Specifically, voltage conversion by bridge type converter 55# for step-up is given by Equation (14) below.

$$VH=1/(1-D)\times Vi \tag{14}$$

In contrast, at the time of step-down operation, in the arm on the load side, switching element Sc as the upper arm element is fixed on and switching element Sd as the lower arm element is fixed off. In the arm on the power source side, switching elements Sa and Sb are turned on/off alternately in complementary manner. If we represent the duty ratio of switching element Sa as the upper arm element by D, the duty ratio of switching element Sb as the lower arm element is (1−D).

Accordingly, bridge type converter 55# comes to operate as a step-down chopper circuit. Therefore, the voltage conversion ratio (VH/Vi) at this time is D. Specifically, the voltage conversion by bridge type converter 55# for step-down is given by Equation (15) below.

$$VH = D \times Vi \quad (15)$$

In power supply system 5# in accordance with a modification of the embodiment also, in each of the direct voltage up/down mode and the indirect voltage up/down mode, parallel connection mode and the series selection mode can be switched.

In the parallel connection mode, as in power supply system 5, one of DC power sources 10 and 20 is subjected to voltage control and the other is subjected to current control.

Again referring to FIG. 26, in the parallel connection mode, for DC power source 10, a bridge type converter is equivalently formed, in which switching element S5 operates as the upper arm element on the power source side (switching element Sa of FIG. 27), switching element S6 operates as the lower arm element on the power source side (switching element Sb of FIG. 27), the pair of switching elements S1 and S2 operates as the upper arm element on the load side (switching element Sc of FIG. 27), and the pair of switching elements S3 and S4 operates as the lower arm element on the load side (switching element Sd of FIG. 27).

Similarly, for DC power source 20, a bridge type converter is equivalently formed, in which switching element S7 operates as the upper arm element on the power source side (switching element Sa of FIG. 27), switching element S8 operates as the lower arm element on the power source side (switching element Sb of FIG. 27), the pair of switching elements S1 and S4 operates as the upper arm element on the load side (switching element Sc of FIG. 27) and the pair of switching elements S2 and S3 operates as the lower arm element on the load side (switching element Sd of FIG. 27).

Figures 30, 31, 32:
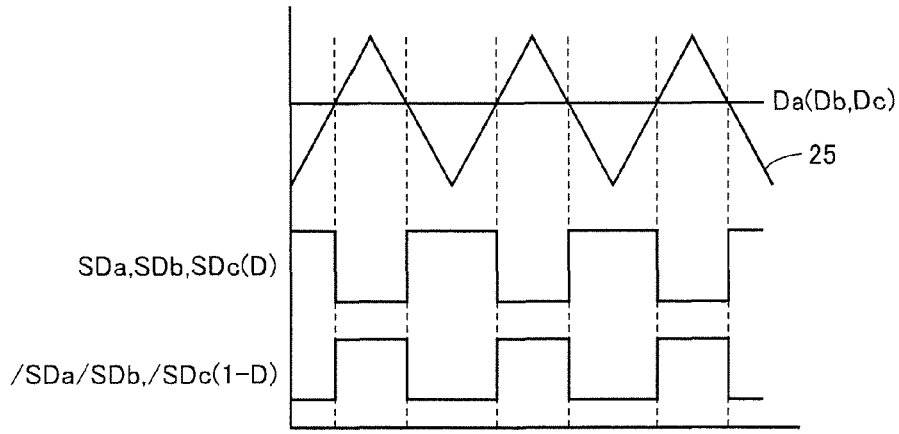
FIG. 30 is a diagram of waveforms representing duty control in the power supply system in accordance with a modification of an embodiment of the present invention.
FIG. 31 is a table representing on/off control of the switching elements in the parallel connection mode in the direct voltage up/down mode of the power supply system in accordance with a modification of an embodiment of the present invention.
FIG. 32 is a table representing on/off control of the switching elements in the series connection mode in the direct voltage up/down mode of the power supply system in accordance with a modification of an embodiment of the present invention.

Referring to FIG. 30, in the parallel connection mode, in accordance with the control block diagram of FIG. 16 or 17, DC power source 10 is subjected to voltage control or current control, whereby the duty ratio Da is calculated. When DC power source 10 is subjected to voltage control, the duty ratio Da is the duty ratio command value Dv (FIG. 16) for voltage control, and duty ratio Db is the duty ratio command value Di (FIG. 17) for current control. On the contrary, when DC power source 20 is subjected to the voltage control, the duty ratio Da is the duty ratio command value Di (FIG. 17) for current control and the duty ratio Db is the duty ratio command value Dv (FIG. 16) for voltage control. Duty ratios Da and Db can be calculated by PWM control similar to that described with reference to FIGS. 14 and 15.

Again referring to FIG. 26, in the series connection mode, switching element S3 is fixed on, so that DC power sources 10 and 20 are connected in series. For the series-connected DC power sources 10 and 20, a bridge type converter is equivalently formed, in which switching element S1 forms the upper arm element on the load side, and switching elements S2 and S4 form the lower arm element on the load side. As to the arms on the power source side, switching elements S5 and S7 form the upper arm element and switching elements S6 and S8 form the lower arm element.

Again referring to FIG. 30, in the series connection mode, as in power supply system 5, series-connected DC power sources 10 and 20 are subjected to voltage control. Specifically, the duty ratio Dc is calculated by voltage-controlling the output voltage Vo in accordance with the control block diagram of FIG. 21. The duty ratio Dc corresponds to the duty ratio command value Dv of FIG. 16. Duty ratio Dc can be calculated by PWM control as described with reference to FIG. 20.

Next, the on/off control of switching elements in the parallel connection mode and the series connection mode in each of the direct voltage up/down mode and the indirect voltage up/down mode will be described in greater detail with reference to FIGS. 31 to 34.

FIG. 31 shows on/off control of the switching elements in the parallel connection mode in the direct voltage up/down mode.

As described above, among the switching elements S5 to S8 corresponding to the arm on the power source side, switching elements S5 and S7 correspond to the upper arm element and switching elements S6 and S8 correspond to the lower arm element. Therefore, switching elements S5 and S7 are controlled in the similar manner as the on/off control of switching element Sa of FIG. 28. Specifically, control signal SG5 for switching element S5 corresponds to the control pulse signal SDa based on the duty ratio Da of DC power source 10.

Similarly, control signal SG7 for switching element S7 corresponds to the control pulse signal SDb based on the duty ratio Db of DC power source 20. Further, regarding switching elements S6 and S8 corresponding to the lower arm element, control signal SG6 for switching element S6 corresponds to the inversion signal (/SDa) of control signal SG5, and control signal SG8 for switching element S8 corresponds to the inversion signal (/SDb) of control signal SG7.

In power supply system 5#, switching elements S1 to S4 form the arms on the load side. Switching element S1 forms the upper arm element on the load side, in each of the bridge type converter corresponding to DC power source 10 and the bridge type converter corresponding to DC power source 20. Therefore, control signal SG1 for switching element S1 is generated in accordance with the logical sum of the control signal SG6 (/SDa) in accordance with the duty ratio (1−Da) on the side of DC power source 10 and the control signal SG8 (/SDb) in accordance with the duty ratio (1−Db) on the side of DC power source 20. As a result, switching element S1 is on/off controlled such that it realizes the functions of both the upper arm element on the load side of the bridge type converter corresponding to DC power source 10 and the upper arm element on the load side of the bridge type converter corresponding to DC power source 20.

Switching element S2 forms the upper arm element in the bridge type converter corresponding to DC power source 10, and forms the lower arm element in the bridge type converter corresponding to DC power source 20. Therefore, control signal SG2 for switching element S2 is generated in accordance with the logical sum of control signals SG6 (/SDa) and SG7 (SDb). As a result, switching element S2 is on/off controlled such that it realizes the functions of both the upper arm element on the load side of the bridge type converter corresponding to DC power source 10 and the lower arm element on the load side of the bridge type converter corresponding to DC power source 20.

Switching element S3 forms the lower arm element on the load side in each of the bridge type converters corresponding to DC power sources 10 and 20, respectively. Therefore, control signal SG3 for switching element S3 is generated in accordance with the logical sum of control signal SG5 (SDa)

and SG7 (SDb). As a result, switching element S3 is on/off controlled such that it realizes the functions of both the lower arm element on the load side of the bridge type converter corresponding to DC power source 10 and the lower arm element on the load side of the bridge type converter corresponding to DC power source 20.

Switching element S4 forms the lower arm element in the bridge type converter corresponding to DC power source 10 and forms the upper arm element in the bridge type converter corresponding to DC power source 20. Therefore, control signal SG4 for switching element S4 is generated in accordance with the logical sum of control signal SG5 (SDa) and SG8 (/SDb). As a result, switching element S4 is on/off controlled such that it realizes the functions of both the lower arm element on the load side of bridge type converter corresponding to DC power source 10 and the upper arm element on the load side of bridge type converter corresponding to DC power source 20.

By the on/off control shown in FIG. 31, in the direct voltage up/down mode of power supply system 5#, the parallel connection mode allowing power exchange between load 30 and DC power sources 10 and 20 in parallel, as in power system 5, can be realized.

FIG. 32 shows on/off control of the switching elements in the series connection mode in the direct voltage up/down mode.

Referring to FIG. 32, in the series connection mode, regarding the arms on the power source side, switching elements S5 and S7 form the upper arm element, and switching elements S6 and S8 from the lower arm element. Therefore, control signals SG5 and SG7 are set in the similar manner as control signal Sa shown in FIG. 28, for controlling the upper arm element on the power source side. Specifically, control signals SG5 and SG7 correspond to the control signal SDc based on the duty ratio Dc. Control signals SG6 and SG8 are set in the similar manner as control signal Sb shown in FIG. 28, for controlling the upper arm element on the power source side. Specifically, control signals SG6 and SG8 correspond to the control signal /SDc based on the duty ratio (1−Dc).

On the other hand, regarding the arms on the load side, switching element S3 is fixed on for connecting DC power sources 10 and 20 in series. Specifically, control signal SG3 is fixed at the H level. Further, for the series-connected DC power sources 10 and 20, switching element S1 forms the upper arm element and switching elements S2 and S4 form the lower arm element. Therefore, control signal SG1 is set in the similar manner as control signal Sc shown in FIG. 28, for controlling the upper arm element on the load side. Specifically, control signal SG1 corresponds to the control signal /SDc based on the duty ratio (1−Dc). Further, control signals SG2 and SG4 are set in the similar manner as control signal Sd shown in FIG. 28, for controlling the lower arm element on the load side. Specifically, control signals SG2 and SG4 correspond to the control signal SDc based on the duty ratio Dc.

By the on/off control shown in FIG. 32, in the direct voltage up/down mode of power supply system 5#, the series connection mode similar to power system 5 (power converter 50) can be realized.

FIG. 33 shows on/off control of the switching elements in the parallel connection mode in the indirect voltage up/down mode.

Referring to FIG. 33, in the indirect voltage up/down mode, it is necessary to change the switching control between the step-up and step-down operations. Therefore, in the parallel connection mode, it is necessary to switch among four different patterns of switching control, based on the magnitudes of voltages V[1] and V[2] and the output voltage Vo, in accordance with the combinations of voltage up/down of DC power source 10 and voltage up/down of DC power source 20.

Switching elements S5 and S6 corresponding to the arm on the power source side on the side of DC power source 10 are controlled in the similar manner as the on/off control of switching elements Sa and Sb shown in FIG. 29, depending on whether the bridge type converter corresponding to DC power source 10 operates to step-up or step-down the voltage. Specifically, at the time of step-up operation, control signal SG5 is fixed at the H level and control signal SG6 is fixed at the L level. At the time of step-down operation, control signal SG5 corresponds to the control pulse signal SDa based on the duty ratio Da of DC power source 10, and control signal SG6 correspond to the inversion signal (/SDa) of control signal SG5.

Switching elements S7 and S8 corresponding to the arm on the power source side on the side of DC power source 20 are controlled in the similar manner as the on/off control of switching elements Sa and Sb shown in FIG. 29, depending on whether the bridge type converter corresponding to DC power source 20 operates to step-up or step-down the voltage. Specifically, at the time of step-up operation, control signal SG7 is fixed at the H level and control signal SG8 is fixed at the L level. At the time of step-down operation, control signal SG7 corresponds to the control pulse signal SDb based on the duty ratio Db of DC power source 20, and control signal SG8 correspond to the inversion signal (/SDb) of control signal SG7.

As described above, switching elements S1 to S4 corresponding to the arms on the load side form the upper or lower arm element of the bridge type converter corresponding to DC power source 10 and the upper or lower arm element of the bridge type converter corresponding to DC power source 20. Therefore, these elements are on/off controlled such that the functions of both the upper and lower arm elements are realized in respective converters, as described above.

By way of example, switching element S1 is controlled in accordance with the logical sum of the control signal for the upper arm element (Sc) for the bridge type converter corresponding to DC power source 10 and the control signal for the upper arm element (Sc) for the bridge type converter corresponding to DC power source 20. Specifically, if voltage is to be stepped-up for both of DC power sources 10 and 20, control signal SG1 for switching element S1 is set in accordance with the logical sum of control signals /SDa and /SDb for the control in accordance with duty ratios (1−Da), (1−Db) of switching element Sc. In contrast, if the voltage is to be stepped-up on the side of DC power source 10 and the voltage is to be stepped-down on the side of DC power source 20, control signal SG1 is set in accordance with the logical sum of control signal /SDa and an H-level signal, to realize both the control in accordance with the duty ratio (1−Da) by switching element Sc on the step-up side and the on-fixation by switching element Sc on the step-down side.

Similarly, if the voltage is to be stepped-down on the side of DC power source 10 and the voltage is to be stepped-up on the side of DC power source 20, control signal SG1 is set in accordance with the logical sum of an H-level signal and control signal /SDb, to realize both the on-fixation by switching element Sc on the step-down side and the control in accordance with duty ratio (1−Db) by switching element Sc on the step-up side.

Further, if the voltage is to be stepped-down for both of DC power sources 10 and 20, control signal SG1 is controlled in accordance with a logical sum of H-level signals, to realize the on-fixation by switching element Sc on the side of each of DC power sources 10 and 20.

Control signal SG2 for switching element S2 is controlled in the similar manner as described in relation to switching control signal SG1, in accordance with the logical sum of the control signal (FIG. 29) of the upper arm element (Sc) of bridge type converter corresponding to DC power source 10 and the control signal (FIG. 29) of the lower arm element (Sd) of bridge type converter corresponding to DC power source 20. Similarly, control signal SG3 is set in accordance with the logical sum of the control signal (FIG. 29) of the lower arm element (Sd) of bridge type converter corresponding to DC power source 10 and the control signal (FIG. 29) of the lower arm element (Sd) of bridge type converter corresponding to DC power source 20. Control signal SG4 is set in accordance with the logical sum of the control signal (FIG. 29) of the lower arm element (Sd) of bridge type converter corresponding to DC power source 10 and the control signal (FIG. 29) of the upper arm element (Sc) of bridge type converter corresponding to DC power source 20.

By the on/off control shown in FIG. 33, in the indirect voltage up/down mode of power supply system 5#, the parallel connection mode allowing power exchange between load 30 and DC power sources 10 and 20 in parallel, as in power system 5, can be realized.

FIG. 34 shows on/off control of the switching elements in the series connection mode in the indirect voltage up/down mode.

Referring to FIG. 34, in the series connection mode, it is necessary to switch the voltage up (Vi<Vo)/down (Vi>Vo) switching control, based on the magnitude of the voltage (V[1]+V[2]=Vi) of series-connected DC power sources 10 and 20 and the output voltage Vo.

At the time of step-up, for fixing on the switching elements S5 and S7 forming the upper arm element on the power source side, control signals SG5 and SG7 are fixed at the H level in accordance with FIG. 29. Further, for fixing off the switching elements S6 and S8 forming the lower arm element of the power source side, control signals SG6 and SG8 are fixed at the L level.

On the other hand, among switching elements S1 to S4 forming the arms on the load side, switching element S3 is fixed on to connect DC power sources 10 and 20 in series. As described above, in the converter corresponding to the series-connected DC power sources 10 and 20, switching element S1 corresponds to the upper arm element on the load side, and switching elements S2 and S4 correspond to the lower arm element on the load side. Therefore, control signal SG1 for switching element S1 is set in accordance with the duty ratio (1−Dc) (that is, control signal /SDc), similar to the control signal Sc (for step-up) shown in FIG. 29. Further, control signals SG2 and SG4 for switching elements S2 and S4 are set in accordance with the duty ratio Dc (that is, control signal SDc), similar to the control signal Sd (for step-up) shown in FIG. 29.

At the time of step-down, switching elements S5 and S7 forming the upper arm element on the power source side are controlled in accordance with the duty ratio Dc, similar to the switching element Sa shown in FIG. 29. Specifically, control signals SG5 and SG7 correspond to control signal SDc. Similarly, switching elements S6 and S8 forming the lower arm element on the power source side are controlled in accordance with the duty ratio (1−Dc), similar to the switching element Sb shown in FIG. 29. Specifically, control signals SG6 and SG8 correspond to control signal /SDc.

Among the switching elements S1 to S4 forming the arms on the load side, switching element S3 is fixed on to connect DC power sources 10 and 20 in series. Control signal SG1 for controlling on/off of the upper arm element is fixed at the H level, similar to the control signal Sc (for step-down) shown in FIG. 29. Further, control signals SG2 and SG4 controlling on/off of the lower arm element are fixed at the L level, similar to the control signal Sd (for step-down) shown in FIG. 29.

By the on/off control shown in FIG. 34, in the indirect voltage up/down mode of power supply system 5#, the series connection mode similar to power system 5 (power converter 50) can be realized.

As described above, in power supply system 5# shown in FIG. 27, by controlling a plurality of switching elements S1 to S4, the mode in which two DC power sources 10 and 20 are connected in parallel and the mode in which the power sources are connected in series can be used selectively, as in power supply system 5.

In the present embodiment and in the modification thereof, examples in which DC power sources of different types, represented by the secondary battery and the electric double-layer capacitor, are used as DC power sources 10 and 20 have been described. By combining DC power sources of different types, particularly sources having different energy density and power density (Ragone plot) for supplying electric power to the load, it becomes easier to ensure electric power for the load over a wide operational range, as the sources operate in mutually good and poor performance ranges complementarily, particularly in the parallel connection mode. Further, when two DC power sources having different output voltages are combined, effective use of DC power sources is expected, because of the switching between the series connection mode and the parallel connection mode. It is noted, however, that the present invention is applicable even if DC power sources 10 and 20 are the power sources of the same rated voltage and/or power sources of the same type. By way of example, the power system of the present invention may suitably be used when DC power sources of the same type are used as a main power source and a sub power source.

Further, it is noted that load 30 may be configured by any device that operates with the controlled DC voltage Vo. Specifically, though examples in which load 30 is a traction motor for running or an inverter mounted on an electric vehicle or a hybrid vehicle have been described in the embodiment above, application of the present invention is not limited to such examples.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a power supply system for exchanging electric power between a load and two DC power sources.

The invention claimed is:

1. A power supply system for use as a step-up chopper circuit, the power supply system comprising:
   a first DC power source;

a second DC power source; and a power converter that converts DC voltage between the first and second DC power sources and a power line electrically connected to a load so as to control an output voltage on the power line, the power converter including a plurality of switching elements, the power converter being configured to be switchable, by controlling the plurality of switching elements, between a first operation mode and a second operation mode, in the first operation mode, the DC voltage conversion is executed with the first and second DC power sources electrically connected in parallel with the power line, and in the second operation mode, the DC voltage conversion is executed with the first and second DC power sources electrically connected in series with the power line, wherein the plurality of switching elements include:
- a first switching element electrically connected between the power line and a first node;
- a second switching element electrically connected between a second node and the first node;
- a third switching element electrically connected between a third node electrically connected to a negative terminal of the second DC power source and the second node; and
- a fourth switching element electrically connected between a negative terminal of the first DC power source and the third node;

the power converter further includes:
- a first reactor electrically connected between the second node and a positive terminal of the first DC power source; and
- a second reactor electrically connected between the first node and the positive terminal of the second DC power source; and in the first operation mode, one of the first and second DC power sources is a voltage source and another one of the first and second DC power sources is a current source, the power converter controls the DC voltage conversion between the one of the first and second DC power sources and the power line such that the one of the first and second DC power sources operating as the voltage source controls the output voltage to be equal to a command voltage, which is different than the output voltage, and the power convertor controls the DC voltage conversion between the other one of the first and second DC power sources and the power line such that the other one of the first and second DC power sources operating as a current source controls a current of the other one of the DC power sources to be equal to a command current, which is different than the current.

2. The power supply system according to claim 1, wherein in the first operation mode, the power converter controls on/off of the first to fourth switching elements in accordance with a logical sum of a first control signal for the DC voltage conversion between the first DC power source and the power line and a second control signal for the DC voltage conversion between the second DC power source and the power line.

3. The power supply system according to claim 2, wherein the first and second DC power sources have rated output voltages different from each other.

4. The power supply system according to claim 2, wherein the first and second DC power sources have output energy densities different from each other and output power densities different from each other.

5. The power supply system according to claim 1, wherein in the second operation mode, the power converter controls on/off of the first to fourth switching elements such that the third switching element is fixed on, while the second and fourth switching elements and the first switching element are turned on/off complementarily in accordance with a control signal for the DC voltage conversion between the series-connected first and second DC power sources and the power line.

6. The power supply system according to claim 5, wherein in the second operation mode, the power converter controls the DC voltage conversion between the series-connected first and second DC power sources and the power line such that the output voltage becomes equal to the command voltage.

7. The power supply system according to claim 5, wherein the first and second DC power sources have rated output voltages different from each other.

8. The power supply system according to claim 5, wherein the first and second DC power sources have output energy densities different from each other and output power densities different from each other.

9. The power supply system according to claim 1, wherein the plurality of switching elements include a switching element which is fixed on to connect the first and second DC power sources in series in the second operation mode and turned on/off in accordance with a duty ratio for DC voltage conversion for controlling the output voltage in the first operation mode.

10. The power supply system according to claim 1, wherein
at least a part of the plurality of switching elements are arranged to be included both in a first power conversion path formed between the first DC power source and the power line in the first operation mode and in a second power conversion path formed between the second DC power source and the power line in the first operation mode.

11. The power supply system according to claim 10, wherein
the at least a part of the switching elements are turned on/off in accordance with a logical sum of a first control signal for the DC voltage conversion between the first DC power source and the power line and a second control signal for the DC voltage conversion between the second DC power source and the power line, in the first operation mode; and
the at least a part of the switching elements are classified to a switching element which is fixed on to connect the first and second DC power sources in series and switching elements which are turned on/off in accordance with a duty ratio for DC voltage conversion for controlling the output voltage in the second operation mode.

12. The power supply system according to claim 10, wherein
the first and second DC power sources have rated output voltages different from each other.

13. The power supply system according to claim 10, wherein
the first and second DC power sources have output energy densities different from each other and output power densities different from each other.

14. The power supply system according to claim 1, wherein
the first and second DC power sources have rated output voltages different from each other.

15. The power supply system according to claim 1, wherein
the first and second DC power sources have output energy densities different from each other and output power densities different from each other.

16. The power supply system according to claim 1, wherein
in the second operation mode, the power converter controls the DC voltage conversion between the series-connected first and second DC power sources and the power line such that the output voltage becomes equal to the command voltage.

* * * * *